(12) United States Patent
Gordon et al.

(10) Patent No.: US 7,652,661 B2
(45) Date of Patent: *Jan. 26, 2010

(54) "SEEING EYE" MOUSE FOR COMPUTER SYSTEM

(75) Inventors: Gary B. Gordon, Saratoga, CA (US); Derek L. Knee, Ft. Collins, CO (US); Rajeev Badyal, Ft. Collins, CO (US); Jason T. Hartlove, Saratoga, CA (US)

(73) Assignee: Avago Technologies ECBU IP (Singapore) Pte. Ltd., Singapore (SG)

( * ) Notice: Subject to any disclaimer, the term of this patent is extended or adjusted under 35 U.S.C. 154(b) by 658 days.

This patent is subject to a terminal disclaimer.

(21) Appl. No.: 11/022,183

(22) Filed: Dec. 23, 2004

(65) Prior Publication Data

US 2005/0179662 A1 Aug. 18, 2005
US 2006/0139332 A9 Jun. 29, 2006

Related U.S. Application Data

(63) Continuation of application No. 10/217,725, filed on Aug. 12, 2002, now Pat. No. 6,950,094, which is a continuation of application No. 09/753,805, filed on Jan. 2, 2001, now Pat. No. 6,433,780, which is a continuation of application No. 09/052,046, filed on Mar. 30, 1998, now Pat. No. 6,281,882, which is a continuation-in-part of application No. 08/540,355, filed on Oct. 6, 1995, now Pat. No. 5,786,804.

(51) Int. Cl.
G09G 5/08 (2006.01)

(52) U.S. Cl. .................... 345/166; 345/159; 345/161; 345/163; 345/165

(58) Field of Classification Search .......... 345/156–167, 345/179, 175, 7–9, 425; 235/462.45, 462.06; 250/557, 208.1; 359/630
See application file for complete search history.

(56) References Cited

U.S. PATENT DOCUMENTS 3,575,505 A 4/1971 Parmigiani (Continued)

FOREIGN PATENT DOCUMENTS

EP 0596594 5/1994

(Continued)

OTHER PUBLICATIONS

John Edward Tanner; Integrated Optical Motion Detection; California Institute of Technology; 1986; pp. 1-128; 5223:TR:86; University Microfilms International; USA.

(Continued)

*Primary Examiner*—Pradobh M Dharia

(57) ABSTRACT

A hand operated pointing device for use with a computer includes a movable housing, a source of non-coherent light illuminating a work surface and circuitry in the movable housing using arrays of data related to light reflected by the illuminated work surface to produce values by processing portions of a first array with portions of a second array. One of the values may be identified to represent movement of the housing relative to the work surface. The light may illuminate surface irregularities at an angle of incidence low enough to produce suitable arrays of data for processing from highlights and shadows of the illuminated surface irregularities. The circuitry may produce additional values by processing another selected portion of the first array with portions of a third array or may select a fourth array for processing with the third array. Predictions may be derived from the values.

287 Claims, 7 Drawing Sheets

U.S. PATENT DOCUMENTS

| | | | |
|---|---|---|---|
| 3,942,022 | A | 3/1976 | Stumpf et al. |
| 4,136,945 | A | 1/1979 | Stephens |
| 4,270,143 | A | 5/1981 | Morris |
| 4,364,035 | A | 12/1982 | Kirsch |
| 4,390,873 | A | 6/1983 | Kirsch |
| 4,494,201 | A | 1/1985 | Reymond et al. |
| 4,521,772 | A * | 6/1985 | Lyon ........................... 345/166 |
| 4,546,347 | A | 10/1985 | Kirsch |
| 4,578,674 | A | 3/1986 | Baker et al. |
| 4,631,400 | A | 12/1986 | Tanner et al. |
| 4,723,297 | A | 2/1988 | Postl |
| 4,751,505 | A | 6/1988 | Williams et al. |
| 4,754,268 | A | 6/1988 | Mori |
| 4,794,384 | A | 12/1988 | Jackson |
| 4,797,544 | A | 1/1989 | Montgomery |
| 4,799,055 | A | 1/1989 | Nestler et al. |
| 4,857,903 | A | 8/1989 | Zalenski |
| 4,920,260 | A | 4/1990 | Victor et al. |
| 4,951,214 | A | 8/1990 | Hollister |
| 4,959,721 | A | 9/1990 | Micic et al. |
| 4,970,557 | A | 11/1990 | Masuda et al. |
| 5,023,922 | A | 6/1991 | Abramovitz et al. |
| 5,045,843 | A | 9/1991 | Hansen |
| 5,089,712 | A | 2/1992 | Holland et al. |
| 5,149,980 | A | 9/1992 | Ertel et al. |
| 5,185,673 | A | 2/1993 | Sobol |
| 5,272,503 | A | 12/1993 | LeSueur et al. |
| 5,285,242 | A | 2/1994 | Kotani |
| 5,355,146 | A | 10/1994 | Chiu et al. |
| 5,363,120 | A | 11/1994 | Drumm |
| 5,388,059 | A | 2/1995 | DeMenthon |
| 5,450,126 | A | 9/1995 | Nishida |
| 5,456,256 | A | 10/1995 | Schneider et al. |
| 5,479,011 | A | 12/1995 | Rudeen et al. |
| 5,490,039 | A | 2/1996 | Helms |
| 5,491,540 | A | 2/1996 | Hirst |
| 5,497,150 | A | 3/1996 | Kimura et al. |
| 5,504,319 | A | 4/1996 | Li et al. |
| 5,510,603 | A | 4/1996 | Hess et al. |
| 5,517,211 | A | 5/1996 | Kwang |
| 5,530,455 | A | 6/1996 | Gillick et al. |
| 5,546,128 | A | 8/1996 | Nakagakiuchi |
| 5,561,543 | A | 10/1996 | Ogawa |
| 5,574,479 | A | 11/1996 | Odell |
| 5,576,529 | A | 11/1996 | Koenck et al. |
| 5,578,813 | A * | 11/1996 | Allen et al. ............... 250/208.1 |
| 5,644,126 | A | 7/1997 | Ogawa |
| 5,644,139 | A * | 7/1997 | Allen et al. ................. 250/557 |
| 5,686,720 | A | 11/1997 | Tullis |
| 5,729,008 | A | 3/1998 | Blalock et al. |
| 5,737,663 | A | 4/1998 | Handa et al. |
| 5,749,019 | A | 5/1998 | Mestha |
| 5,764,220 | A | 6/1998 | Yoshizawa |
| 5,786,804 | A * | 7/1998 | Gordon ....................... 345/158 |
| 5,837,987 | A | 11/1998 | Koenck et al. |
| 5,841,121 | A | 11/1998 | Koenck |
| 5,894,302 | A | 4/1999 | Scenna et al. |
| 5,962,838 | A * | 10/1999 | Tamburrini ............ 235/462.45 |
| 5,994,710 | A * | 11/1999 | Knee et al. .................. 250/557 |
| 6,003,773 | A | 12/1999 | Durbin et al. |
| 6,014,161 | A | 1/2000 | Hirst et al. |
| 6,084,574 | A * | 7/2000 | Bidiville ..................... 345/166 |
| 6,172,354 | B1 | 1/2001 | Adan et al. |
| 6,175,357 | B1 | 1/2001 | Gordon |
| 6,232,959 | B1 * | 5/2001 | Pedersen .................... 345/161 |
| 6,256,016 | B1 * | 7/2001 | Piot et al. ................... 345/166 |
| 6,281,882 | B1 | 8/2001 | Gordon et al. |
| 6,285,400 | B1 | 9/2001 | Hokari |
| 6,356,392 | B1 * | 3/2002 | Spitzer ....................... 359/630 |
| 6,618,093 | B1 | 9/2003 | Levy |
| 6,823,077 | B2 * | 11/2004 | Dietz et al. ................. 382/107 |
| 6,915,955 | B2 * | 7/2005 | Jung et al. .............. 235/462.06 |
| 6,927,758 | B1 * | 8/2005 | Piot et al. ................... 345/166 |
| 7,042,440 | B2 * | 5/2006 | Pryor et al. ................. 345/158 |
| 2003/0021446 | A1 * | 1/2003 | Dietz et al. ................. 382/107 |
| 2005/0231483 | A1 | 10/2005 | Gordon et al. |

FOREIGN PATENT DOCUMENTS

| | | |
|---|---|---|
| EP | 0645732 | 3/1995 |
| JP | H1-287725 | 11/1989 |
| JP | H3-287002 | 12/1991 |
| JP | 04/253220 | 9/1992 |
| WO | WO-95/19031 | 7/1995 |

OTHER PUBLICATIONS

John Watkinson; The Engineer's Guide to Motion Compensation; Handbook Series; 1994; pp. 2-62, Snell & Wilcox; UK.

Paul G. Schrier; Optical Mouse Requires No Grid Pad; EDN, vol. 29, No. 2., Jan. 26, 1984; pp. 84; USA.

Randy Gobbel and Dave Curbow; Recollections from two people who worked at Xerox; May 6, 2004; www.netclique.net; USA.

PIXART's Final Invalidity Contentions for the '780 Patent (Pat. L.R. 3-6(b)); Case No. C 03-4871 JW; May 19, 2005; with Appendix A (Identification of Prior Art) and Appendix B (Claim Charts). Publications cited in Appendix A are listed below; U.S. Patents cited in Appendix A are listed on the attached PTO/SB08/A.

Xavier Arreguite, F. Andre Van Schaik, Student Member, IEEE, Francois V.Baudin, Marc Bidiville, Eric Raeber; A CMOS Motion Detector System for Pointing Devices; IEEE Journal of Solid State Circuits; Dec. 12, 1996; pp. 1916-1921; vol. 31, No. 12; IEEE; Switzerland.

J. L. Barron, D. J. Fleet and S. S. Beauchemin; *Systems and Experiment* Performance of Optical Flow Techniques; International Journal of Computer Vision; 1994; pp. 43-77; 12:1; Kluwer Academic Publishers; The Netherlands.

S. S. Beauchemin and J. L.Barron; The Computation of Optical Flow; University of Western Ontario; Sep. 1995; pp. 433-467; vol. 27, No. 3; ACM Computing Surveys.

G. Bishop; Self-Tracker: a Smart Optical Sensor on Silicon; UNC Computer Science Dissertation TR84-002; 1984; pp. 1-2; USA.

Edward S. Chornoboy, Anne M.Matlin and John P. Morgan; Automated Storm Tracking for Terminal Air Traffic Control; Lincoln Laboratory Journal; 1994; pp. 427-448; vol. 7, No. 2; USA.

Massimo Gottardi and Woodward Yang; FA 12.5: A CCD/CMOS Image Motion Sensor; International Solid State Circuits Conference; 1993; pp. 194-195; Session 12; Digest of Technical Papers; USA.

Christof Koch, Andrew Moore, Wyeth Bair, Timothy Horiuchi, Brooks Bishofberger and John Lazzaro; Computing Motion Using Analog VLSI Vision Chips: An Experimental Comparison Among Four Approaches; 1991; pp. 312-324; IEEE; USA.

Richard Szeliski; Shape From Rotation; Cambridge Research Laboratory; Dec. 21, 1990; pp. 1-38; 5223:TR:86; University Microfilms International; USA.

James J. Little, Heinrich H. Bulthoff and Tomaso Poggio; Parallel Optical Flow Using Local Voting; 1988; pp. 454-459; IEEE; USA.

R.F. Lyon; The Optical Mouse, and an Architectural Methodology for Smart Digital Sensors; VLSI System Design Area, Xerox Palo Alto Research Center; Oct. 1981; pp. 1-19; Conference on VLSI Systems and Computation; Computer Science Press, Inc. Rockville, MD.

Richard Szeliski; Shape From Rotation; Cambridge Research Laboratory; Dec. 21, 1990; pp. 1-38; 5223:TR:86; University Microfilms International; USA.

J.E. Tanner and C. Mead; A Correlating Optical Motion Detector; Conference on Advanced Research in VLSI, MIT; Jan. 1984; pp. 57-64; USA.

Pixart's Preliminary Invalidity Contentions under Patent Local Rule 3-3; Case No. C Mar. 4871 JW; Jun. 30, 2005; with Appendix A (Identification of Prior Art) and Appendix B (Claim Charts). Publications cited in Appendix A are listed below; U.S. Patents cited in Appendix A are listed on the attached PTO/SB08/A.

Elan Microelectronic's and Elan Information Technology Group's Preliminary Invalidity Contentions and Accompanying Document Productions under Patent L.W. 3-3 and 3-4, Case No. C 04-5385 JW; Oct. 28, 2005; including Exhibits 1-29 (Claim Charts). Publications cited in this document are listed below; U.S. Patents cited in this document are listed on the attached PTO/SB08/A.

R.F. Lyon; The Optical Mouse, and an Architectural Methodology for Smart Digital Sensors; Conference on VLSI Systems and Computations; Oct. 1981; pp. 1-19; Computer Science Press, Inc., Rockville, MD.

Pixart's Preliminary Invalidity Contentions under Patent Local Rule 3-3; Case No. C 03-4871 JW; Jan. 5, 2006; with Appendix A (Identification of Prior Art) and Appendix B (Claim Charts). Publications cited in Appendix A are listed below; U.S. Patents cited in Appendix A are listed on the attached PTO/SB08/A.

Agilent's Opening Claim Construction Brief Re U.S. Patent No. 6,433,780; *Pixart v. Agilent* Case No. C 03-04871 JW; Oct. 22, 2004; pp. 1-22; U.S. District Court, Northern District of California, San Jose Division.

PixArt's Responsive Claim Construction Brief Re U.S. Patent No. 6,433,780; *Pixart v. Agilent* Case No. C 03-04871 JW; Nov. 2, 2004; pp. 1-25; U.S. District Court, Northern District of California, San Jose Division.

Agilent's Reply Brief On Claim Construction; *Pixart v. Agilent* Case No. C 03-04871 JW; Nov. 10, 2004; pp. 1-15; U.S. District Court, Northern District of California, San Jose Division.

Order Following Claim Construction Hearing Setting Case Management Conference; *Pixart v. Agilent* Case No. C 03-04871 JW; Mar. 30, 2005; pp. 1-15; U.S. District Court, Northern District of California, San Jose Division.

Agilent's Opening Claim Construction Brief Re U.S. Patent No. 6,433,780; *Agilent v. Elan* Case No. C 04-05385 JW; Feb. 9, 2006; pp. 1-30; U.S. District Court, Northern District of California, San Jose Division.

Elan's Responsive Claim Construction Brief Re U.S. Patent No. 6,433,780 (Patent L.R. 4-5(b)); *Agilent v. Elan* Case No. C 04-05385 JW; Feb. 23, 2006; pp. 1-23; U.S. District Court, Northern District of California, San Jose Division.

Agilent's Reply Brief On Claim Construction Re U.S. Patent No. 6,433,780; *Agilent v. Elan* Case No. C 04-05385 JW; Mar. 2, 2006; pp. 1-14; U.S. District Court, Northern District of California, San Jose Division.

Agilent's Opening Claim Construction Brief Re U.S. Patent No. 5,786,804; *Agilent v. Pixart* Case No. C 03-04871 JW and Case No. C 04-05385 JW; and Agilent Technologies, Inc.'s Opening Claim Construction Brief Re U.S. Patent No. 5,686,720; *Agilent v. Pixart* Case No. C 03-04871 JW; Feb. 9, 2006; pp. 1-31; U.S. District Court, Northern District of California, San Jose Division.

PixArt's Responsive Brief Re Claim Construction Of U.S. Patent Nos. 5,686,720 and 5,786,804; *Agilent v. Pixart* Case No. C 03-04871 JW; Feb. 23, 2006; pp. 1-25; U.S. District Court, Northern District of California, San Jose Division.

Elan's Responsive Claim Construction Brief for U.S. Patent No. 5,786,804 (Patent L.R. 4-5(b)); *Agilent v. Elan* Case No. C 04-05385 JW; Mar. 23, 2006; pp. 1-23; U.S. District Court, Northern District of California, San Jose Division.

Agilent's Reply Brief On Claim Construction Re U.S. Patent No. 5,786,804; *Agilent v. Pixart* Case No. C 03-04871 JW and Case No. C 04-05385 JW; and Agilent Technologies, Inc.'s Reply Brief On Claim Construction Re U.S. Patent No. 5,686,720; *Agilent v. Pixart* Case No. C 03-04871 JW; Mar. 2, 2006; pp. 1-15; U.S. District Court, Northern District of Calif., San Jose Div.

PixArt's Sur-Reply Brief Re Claim Construction Of '804 and '720 Patents; *Agilent v. Pixart* Case No. C 03-04871 JW; Mar. 3, 2006; pp. 1-2; U.S. District Court, Northern District of California, San Jose Division.

Elan's Proposed Claim Construction Sur-Reply For U.S. Patent No. 5,786,804; *Agilent v. Elan* Case No. C 04-5385 JW; Mar. 28, 2006; pp. 1-5; U.S. District Court, Northern District of California, San Jose Division.

Agilent's Opposition to Elan's Motion for Administrative Relief Requesting Leave to File Sur-Reply Re Claim Construction of U.S. Patent No. 5,786,804; *Agilent v. Elan* Case No. C 04-5385 JW; Mar. 31, 2006; pp. 1-3; U.S. District Court, Northern District of California, San Jose Division.

PixArt's Memo of Points and Authorities in Support Of Its Motion for Summary Judgment Of Non-Infringement Of U.S. Patent No. 6,433,780; *Pixart v. Agilent* Case No. C 03-04871 JW; Jun. 27, 2005; pp. 1-24; U.S. District Court, Northern District of California, San Jose Division.

Agilent's Opposition to PixArt's Motion For Summary Judgment of NonInfringement of U.S. Patent No. 6,433,780 (Redacted Version); *Pixart v. Agilent* Case No. C 03-04871 JW; Aug. 23, 2005; pp. 1-27; U.S. District Court, Northern District of California, San Jose Division.

Reply Brief On PixArt's Motion for Summary Judgment Of Non-Infringement Of The '780 Patent; *Agilent v. Pixart* Case No. C 03-04871 JW; Sep. 19, 2005; pp. 1-15; U.S. District Court, Northern District of California, San Jose Division.

Agilent's Surreply In Opposition To PixArt's Motion For Summary Judgement Of Non-Infringement Of The '780 Patent; *Agilent v. Pixart* Case No. C 03-04871 JW; Oct. 28, 2005; pp. 1-5; U.S. District Court, Northern District of Calif., San Jose Div.

Opposition To Agilent's Motion for Administrative Relief For Leave To File its Proposed Surreply; *Agilent v. Elan* Case No. C 03-04871 JW; Nov. 11, 2005; pp. 1-5; U.S. District Court, Northern District of California, San Jose Division.

Agilent's Redacted Memo of Points And Authorities In Support Of Its Cross-Motion For Partial Summary Judgment Of Infringement of U.S. Patent No. 6,433,780; *Agilent v. Pixart* Case No. C 03-04871 JW; Jan. 26, 2006; pp. 1-21; U.S. District Court, Northern District of California, San Jose Division.

Opposition To Agilent's Motion For Partial Summary Judgment Of Infringement (Redacted Version); *Agilent v. Pixart* Case No. C 03-04871 JW; Feb. 21, 2006; pp. 1-21; U.S. District Court, Northern District of California, San Jose Division.

Agilent's Reply Brief In Support Of Its Cross-Motion for Partial Summary Judgment of Infringement Of U.S. Patent No. 6,433,780 (Redacted Version); *Agilent v. Pixart* Case No. C 03-04871 JW; Feb. 27, 2006; pp. 1-15; U.S. District Court, Northern District of California, San Jose Division.

Sur-Reply In Opposition To Agilent's Cross-Motion For Partial Summary Judgment Of Infringement of U.S. Patent No. 6,433,780; *Agilent v. Pixart* Case No. C 03-04871 JW; Mar. 2, 2006; pp. 1-6; U.S. District Court, Northern District of California, San Jose Division.

Opposition To PixArt's Motion For Administrative Relief Requesting Leave to File Proposed Sur-Reply in Opposition To Agilent's Cross-Motion For Partial Summary Judgment Of Infringement of U.S. Patent No. 6,433,780; *Agilent v. Pixart* Case No. C 03-04871 JW; Mar. 7, 2006; pp. 1-3; U.S. District Court, Northern District of California, San Jose Division.

"Translated Patent Abstract for", JP 04/253220.

Defendants Elan Microelectronics and Elan Information Technology Group's Preliminary Invalidity Contentions and Accompanying Document Production Under Patent L.R. 3-3 and 3-4; *Agilent Technologies* vs. *Elan Microelectronics Corp.* Case No. C 04-5385 JW; U.S. District Court, Northern District of California, San Jose Division.

Amended Joint Claim Construction and Prehearing Statement Pursuant to Patent L.R. 4-3; *Avago Technologies* vs. *Elan Microelectronics Corp.* Case No. C 04-5385 JW; Jun. 1, 2006; Document 88; U.S. District Court, Northern District of California, San Jose Division.

Elan Microelectronics Corp. and Elan Information Technology Group's Notice and Motion for Summary Judgment of Non-Infringement of U.S. Patent No. 5,786,804; *Avago Technologies* vs. *Elan Microelectronics Corp.* Case No. C 04-5385; Jul. 11, 2006; Document 89; U.S. District Court, Northern District of California, San Jose Division.

Elan Microelectronics Corp. and Elan Information Technology Group's Notice and Motion for Summary Judgment of Non-Infringement of U.S. Patent No. 6,433,780; *Avago Technologies* vs. *Elan Microelectronics Corp.* Case No. Apr. 5385 JW; Jul. 11, 2006; Document 94; U.S. District Court, Northern District of California, San Jose Division.

Avago's Redacted Opposition to Elan's Motion for Summary Judgment of Non-Infringement of U.S. Patent No. 5,786,804; *Avago Technologies* vs. *Elan Microelectronics Corp.* Case No. 04-05385 JW; Oct. 2, 2006; Document 130; U.S. District Court, Northern District of California, San Jose Division.

Elan Microelectronics Corp.'s and Elan Information Technology Group's Reply in Support of Motion for Summary Judgment of Noninfringement; *Avago Technologies* vs. *Elan Microelectronics Corp.* Case No. C-04-5385-JW; Oct. 16, 2006; Document 139-1; U.S. District Court, Northern District of California, San Jose Division.

Elan Microelectronics Corp.'s and Elan Information Technology Group's Reply in Support of Motion for Summary Judgment of Noninfringement; *Avago Technologies* vs. *Elan Microelectronics Corp.* Case No. C-04-5385-JW; Oct. 16, 2006; Document 140; U.S. District Court, Northern District of California, San Jose Division.

Order Denying Defendants' Motions for Summary Judgment; Setting Schedule for further Briefing and further Claim Construction Hearing; *Avago Technologies* vs. *Elan Microelectronics Corp.* Case No. C-04-05385-JW; Feb. 8, 2007; Document 166; U.S. District Court, Northern District of California, San Jose Division.

Elan's Supplemental Claim Construction Brief; *Avago Technologies* vs. *Elan Microelectronics Corp.* Case No. C-04-5385 JW; Mar. 5, 2007; Document 179; U.S. District Court, Northern District of California, San Jose Division.

Avago's Supplemental Claim Construction Brief Re U.S. Patent No. 6,433,780 Submitted Pursuant to Court Order; *Avago Technologies* vs. *Elan Microelectronics Corp.* Case No. C-04-05385 JW; Mar. 5, 2007; Document 181; U.S. District Court, Northern District of California, San Jose Division.

Declaration of Professor Ralph Etienne-Cummings in Support of Avago's Supplemental Claim Construction Brief Re U.S. Patent No. 6,433,780; *Avago Technologies* vs. *Elan Microelectronics Corp.* Case No. C-04-05385 JW; Mar. 5, 2007; Document 182; U.S. District Court, Northern District of California, San Jose Division.

Elan Microelectronics Corp. and Elan Information Technology Group's Notice of Motion and Motion for Summary Judgment of Invalidity of U.S. Patent No. 6,433,780 B1; *Avago Technologies* vs. *Elan Microelectronics Corp.* Case No. C-04-05385 JW; May 1, 2007; Document 232; U.S. District Court, Northern District of California, San Jose Division.

Declaration of Dr. Berthold K.P. Horn in Support of Elan Microelectronics Corp. and Elan Information Technology Group's Motion for Summary Judgment—Invalidity—'780 Patent; *Avago Technologies* vs. *Elan Microelectronics Corp.* Case No. C-04-05385 JW; May 1, 2007; Document 238; U.S. District Court, Northern District of California, San Jose Division.

Elan Microelectronics Corp. and Elan Information Technology Group's Notice of Motion and Motion for Summary Judgment of Invalidity of U.S. Patent No. 5,786,804; *Avago Technologies* vs. *Elan Microelectronics Corp.* Case No. C-04-5385 JW; May 1, 2007; Document 239; U.S. District Court, Northern District of California, San Jose Division.

Declaration of Dr. Berthold K.P. Horn in Support of Elan Microelectronics Corp.and Elan Information Technology Group's Motion for Summary Judgment—Invalidity—'804 Patent; *Avago Technologies* vs. *Elan Microelectronics Corp.* Case No. C-04-05385 JW; May 1, 2007; Document 241; U.S. District Court, Northern District of California, San Jose Division.

Avago's Memorandum of Points and Authorities in Support of It's Opposition to Elan's Motion for Summary Judgment of Invalidity of U.S. Patent No. 6,433,780; *Avago Technologies* vs. *Elan Microelectronics Corp.* Case No. C-04-05385 JW; May 15, 2007; Document 256; U.S. District Court, Northern District of California, San Jose Division.

Declaration of John R. Grindon in Support of Avago's Opposition to Elan's Motion for Summary Judgment of Invalidity of U.S. Patent No. 5,786,804; *Avago Technologies* vs. *Elan Microelectronics Corp.* Case No. C-04-05385 JW (HRL); May 15, 2007; Document 258; U.S. District Court, Northern District of California, San Jose Division.

Avago's Opposition to Elan's Motion for Summary Judgment of Invalidity of U.S. Patent No. 5,786,804; *Avago Technologies* vs. *Elan Microelectronics Corp.* Case No. C-04-05385 JW (HRL); U.S. District Court, Northern District of California, San Jose Division, Jun. 5, 2007.

Elan Microelectronics Corp. and Elan Information Technology Group's Second Notice of Motion and Motion for Summary Judgment of Non-Infringement of U.S. Patent No. 5,786,804; *Avago Technologies* vs. *Elan Microelectronics Corp.* Case No. C-04-5385 JW; Jun. 5, 2007; Document 267; U.S. District Court, Northern District of California, San Jose Division.

Elan Microelectronics Corp. and Elan Information Technology Group's Second Notice and Motion for Summary Judgment of Non-Infringement of U.S. Patent No. 6,433,780; *Avago Technologies* vs. *Elan Microelectronics Corp.* Case No. C-04-5385 JW; Jun. 5, 2007; Document 271; U.S. District Court, Northern District of California, San Jose Division.

Elan Microelectronics Corp. and Elan Information Technology Group's Reply Memorandum in Support of Motion for Summary Judgment of Invalidity of U.S. Patent 6,433,780 B1; *Avago Technologies* vs. *Elan Microelectronics Corp.* Case No. C-04-5385 JW; Jun. 12, 2007; Document 282; U.S. District Court, Northern District of California, San Jose Division.

Elan Microelectronics Corp. and Elan Information Technology Group's Reply Memorandum in Support of Motion for Summary Judgment of Invalidity of U.S. Patent 5,786,804; *Avago Technologies* vs. *Elan Microelectronics Corp.* Case No. C-04-5385 JW; Jun. 12, 2007; Document 283; U.S. District Court, Northern District of California, San Jose Division.

Second Claim Construction Order; *Avago Technologies* vs. *Elan Microelectronics Corp.* Case No. C-04-05385 JW; Jun. 13, 2007; Document 290; U.S. District Court, Northern District of California, San Jose Division.

Elan Microelectronics Corp. and Elan Information Technology Group's Supplemental Reply Memorandum in Support of Motion for Summary Judgment of Invalidity of U.S. Patent 5,786,804; *Avago Technologies* vs. *Elan Microelectronics Corp.* Case No. C-04-5385 JW; Jun. 15, 2007; Document 292-2; U.S. District Court, Northern District of California, San Jose Division.

Avago's Response to Elan Microelectronics Corp. and Elean Information Technology Group's Supplemental Reply Memorandum in Support of Motion for Summary Judgment of Invalidity of U.S. Patent 5,786,804; *Avago Technologies* vs. *Elan Microelectronics Corp.* Case No. C-04-05385 JW (HRL); Jun. 21, 2007; Document 304; U.S. District Court, Northern District of California, San Jose Division.

Elan Microelectronics Corp. and Elan Information Technology Group's Opposition to Motion for Partial Summary Judgment of Infringement of U.S. Patent No. 5,786,804; *Avago Technologies* vs. *Elan Microelectronics Corp.* Case No. C-04-5385 JW; Jul. 2, 2007; Document 315; U.S. District Court, Northern District of California, San Jose Division.

Avago's Redacted Memorandum of Points and Authorities in Opposition to Elan's Second Motion for Partial Summary Judgment of Non-Infringement of U.S. Patent No. 6,433,780; *Avago Technologies* vs. *Elan Microelectronics Corp.* Case No. C-04-5385 JW; Jul. 3, 2007; Document 318; U.S. District Court, Northern District of California, San Jose Division.

Avago's Redacted Memorandum of Points and Authorities in Opposition to Elan's Second Motion for Summary Judgment of Non-Infringement of U.S. Patent No. 5,786,804; *Avago Technologies* vs. *Elan Microelectronics Corp.* Case No. C-04-5385 JW; Jul. 3, 2007; Document 322; U.S. District Court, Northern District of California, San Jose Division.

Elan Microelectronics Corp. and Elan Information Technology Group's Reply in Support of Second Motion for Summary Judgment of Non-Infringement of U.S. Patent No. 5,786,804; *Avago Technologies* vs. *Elan Microelectronics Corp.* Case No. C-04-05385-JW; Jul. 18, 2007; Document 342; U.S. District Court, Northern District of California, San Jose Division.

Avago's Redacted Reply Memorandum in Support of Motion for Partial Summary Judgment of Infringement of U.S. Patent No. 5,786,804; *Avago Technologies* vs. *Elan Microelectronics Corp.* Case No. C-04-5385-JW (HRL); Jul. 18, 2007; Document 345; U.S. District Court, Northern District of California, San Jose Division.

Elan Microelectronics Corp. and Elan Information Technology Group's Reply in Support of Second Motion for Summary Judgment of Non-Infringement U.S. Patent No. 6,433,780; *Avago Technologies* vs. *Elan Microelectronics Corp*. Case No. C-04-5385-JW; Jul. 19, 2007; Document 349; U.S. District Court, Northern District of California, San Jose Division.

U.S. Appl. No. 11/154,007, "Final Rejection", Sep. 19, 2008.
U.S. Appl. No. 11/154,007, "Non-Final Rejection", Feb. 25, 2008.
U.S. Appl. No. 11/154,007, "Notice of Allowance", May 26, 2009.
U.S. Appl. No. 11/154,007, "Notice of Allowance", Dec. 2, 2008.

* cited by examiner

"SEEING EYE" MOUSE FOR COMPUTER SYSTEM

CROSS REFERENCE TO RELATED APPLICATION

This application is a continuation of Ser. No. 10/217,725, filed Aug. 12, 2002, now U.S. Pat. No. 6,950,094, which is a continuation of Ser. No. 09/753,805, filed Jan. 2, 2001, now U.S. Pat. No. 6,433,780, which is a continuation of Ser. No. 09/052,046, filed Mar. 30, 1998, now U.S. Pat. No. 6,281,882, which is a continuation-in-part of Ser. No. 08/540,355 filed Oct. 6, 1995, now U.S. Pat. No. 5,786,804.

REFERENCE TO RELATED PATENTS

This Application is related to the subject matter described in the following two U.S. patents: U.S. Pat. No. 5,578,813 filed 2 Mar. 1995, issued 26 Nov. 1996 and entitled FREEHAND IMAGE SCANNING DEVICE WHICH COMPENSATES FOR NON-LINEAR MOVEMENT; and U.S. Pat. No. 5,644,139, filed 14 Aug. 1996, issued 1 Jul. 1997 and entitled NAVIGATION FOR DETECTING MOVEMENT OF NAVIGATION SENSORS RELATIVE TO AN OBJECT. Both of these Patents have the same inventors: Ross R. Allen, David Beard, Mark T. Smith and Barclay J. Tullis, and both Patents are assigned to Hewlett-Packard Co. This application is also related to the subject matter described in U.S. Pat. No. 5,786,804 filed 6 Oct. 1995, entitled METHOD AND SYSTEM FOR TRACKING ATTITUDE, issued 28 Jul. 1998, and also assigned to Hewlett-Packard Co. These three Patents describe techniques of tracking position movement. Those techniques are a component in the preferred embodiment described below. Accordingly, U.S. Pat. Nos. 5,578,813, 5,644,139 and 5,786,804 are hereby incorporated herein by reference.

BACKGROUND OF THE INVENTION

The use of a hand operated pointing device for use with a computer and its display has become almost universal. By far the most popular of the various devices is the conventional (mechanical) mouse. A conventional mouse typically has a bottom surface carrying three or more downward projecting pads of a low friction material that raise the bottom surface a short distance above the work surface of a cooperating mouse pad. Centrally located within the bottom surface of the mouse is a hole through which a portion of the underside of a rubber-surfaced steel ball (hereinafter called simply a rubber ball) extends; in operation gravity pulls the ball downward and against the top surface of the mouse pad. The mouse pad is typically a closed cell foam rubber pad covered with a suitable fabric. The low friction pads slide easily over the fabric, but the rubber ball does not skid, but instead rolls as the mouse is moved. Interior to the mouse are rollers, or wheels, that contact the ball at its equator (the great circle parallel to the bottom surface of the mouse) and convert its rotation into electrical signals. The external housing of the mouse is shaped such that when it is covered by the user's hand it appears to have a "front-to-back" axis (along the user's forearm) and an orthogonal "left-to-right" axis. The interior wheels that contact the ball's equator are arranged so that one wheel responds only to rolling of the ball that results from a motion component of the mouse that is along the front-to-back axis, and also so that the other wheel responds only to rolling produced by a motion component along the left-to-right axis. The resulting rotations of the wheels or contact rollers produce electrical signals representing these motion components. (Say, F/B representing Forward and Backward, and L/R representing Left or Right.) These electrical signals F/B and L/R are coupled to the computer, where software responds to the signals to change by a $\Delta x$ and a $\Delta y$ the displayed position of a pointer (cursor) in accordance with movement of the mouse. The user moves the mouse as necessary to get the displayed pointer into a desired location or position. Once the pointer on the screen points at an object or location of interest, one of one or more buttons on the mouse is activated with the fingers of the hand holding the mouse. The activation serves as an instruction to take some action, the nature of which is defined by the software in the computer.

Unfortunately, the usual sort of mouse described above is subject to a number of shortcomings. Among these are deterioration of the mouse ball or damage to its surface, deterioration or damage to the surface of the mouse pad, and degradation of the ease of rotation for the contact rollers (say, (a) owing to the accumulation of dirt or of lint, or (b) because of wear, or (c) both (a) and (b)). All of these things can contribute to erratic or total failure of the mouse to perform as needed. These episodes can be rather frustrating for the user, whose complaint might be that while the cursor on the screen moves in all other directions, he can't get the cursor to, say, move downwards. Accordingly, industry has responded by making the mouse ball removable for easy replacement and for the cleaning of the recessed region into which it fits. Enhanced mouse ball hygiene was also a prime motivation in the introduction of mouse pads. Nevertheless, some users become extremely disgusted with their particular mouse of the moment when these remedies appear to be of no avail. Mouse and mouse pad replacement is a lively business.

The underlying reason for all this trouble is that the conventional mouse is largely mechanical in its construction and operation, and relies to a significant degree on a fairly delicate compromise about how mechanical forces are developed and transferred.

There have been several earlier attempts to use optical methods as replacements for mechanical ones. These have included the use of photo detectors to respond to mouse motion over specially marked mouse pads, and to respond to the motion of a specially striped mouse ball. U.S. Pat. No. 4,799,055 describes an optical mouse that does not require any specially pre-marked surface. (Its disclosed two orthogonal one pixel wide linear arrays of photo sensors in the X and Y directions and its state-machine motion detection mechanism make it a distant early cousin to the technique of the incorporated patents, although it is our view that the shifted and correlated array [pixel pattern within an area] technique of the incorporated patents is considerably more sophisticated and robust.) To date, and despite decades of user frustration with the mechanical mouse, none of these earlier optical techniques has been widely accepted as a satisfactory replacement for the conventional mechanical mouse. Thus, it would be desirable if there were a non-mechanical mouse that is viable from a manufacturing perspective, relatively inexpensive, reliable, and that appears to the user as essentially the operational equivalent of the conventional mouse. This need could be met by a new type of optical mouse has a familiar "feel" and is free of unexpected behaviors. It would be even better if the operation of this new optical mouse did not rely upon cooperation with a mouse pad, whether special or otherwise, but was instead able to navigate upon almost any arbitrary surface.

SUMMARY OF THE INVENTION

A hand operated pointing device for use with a computer is disclosed having a movable housing, a source of non-coherent light illuminating a work surface and circuitry in the movable housing using a plurality of two dimensional arrays of data related to light reflected by the illuminated work surface to produce a first plurality of values by processing at least a portion of a first array of the plurality of arrays of data with a plurality of portions of a second array of the plurality of arrays of data, the circuitry processes the first plurality of values to identify a value representing a valid first movement of the housing relative to the work surface.

A hand operated pointing device for use with a computer is disclosed having a movable housing, circuitry in the movable housing using a plurality of two dimensional arrays of data related to light reflected from a work surface to produce a first plurality of values by processing a selected first portion of a first array of the plurality of arrays with a plurality of portions of a second array of the plurality of arrays, the circuitry processes the first plurality of values to identify a value representing a valid first movement of the housing relative to the work surface, and a source of non-coherent light illuminating surface irregularities on the work surface at an angle of incidence low enough to produce suitable arrays of data for processing from highlights and shadows of the illuminated surface irregularities.

A hand operated pointing device for use with a computer is disclosed including a movable housing, a light source illuminating a work surface, and circuitry in the movable housing using a plurality of two dimensional arrays of data related to light reflected by the illuminated work surface to produce a first plurality of values by processing a selected first portion of a first array of the plurality of arrays with a plurality of portions of a second array of the plurality of arrays, the circuitry produces a second plurality of values by processing a second selected portion of the first array with portions of a third array and processes the first and second pluralities of values to identify movement of the housing relative to the work surface.

A hand operated pointing device for use with a computer is disclosed having a movable housing, a light source illuminating a work surface, and circuitry in the movable housing using a plurality of arrays of data related to light reflected by the illuminated work surface to produce a first plurality of values by processing at least a portion of a first array of the plurality of arrays with a plurality of portions of a second array of the plurality of arrays, the circuitry derives a prediction of a movement of the housing relative to the work surface from the first plurality of values.

A hand operated pointing device for use with a computer is disclosed including a movable housing, a light source illuminating a work surface, and circuitry in the movable housing using a plurality of arrays of data related to light reflected by the illuminated work surface to produce a first plurality of values by processing at least a portion of a first array of the plurality of arrays with a plurality of portions of a second array of the plurality of arrays, the circuitry selects a portion of the first array, or selects a third array of the plurality of arrays, in accordance with a prediction of a movement to produce a second plurality of values.

A hand operated pointing device for use with a computer is disclosed including a movable housing, a light source illuminating a work surface, and circuitry in the movable housing using a plurality of arrays of data related to light reflected by the illuminated work surface to produce a first plurality of values by processing at least a portion of a first array of the plurality of arrays with a plurality of portions of a second array of the plurality of arrays, the circuitry processes the values of the first plurality of values and sends a signal to the computer related to a valid movement of the housing with respect to the work surface only if a valid movement is identified.

DESCRIPTION OF A PREFERRED EMBODIMENT

Figure 1:
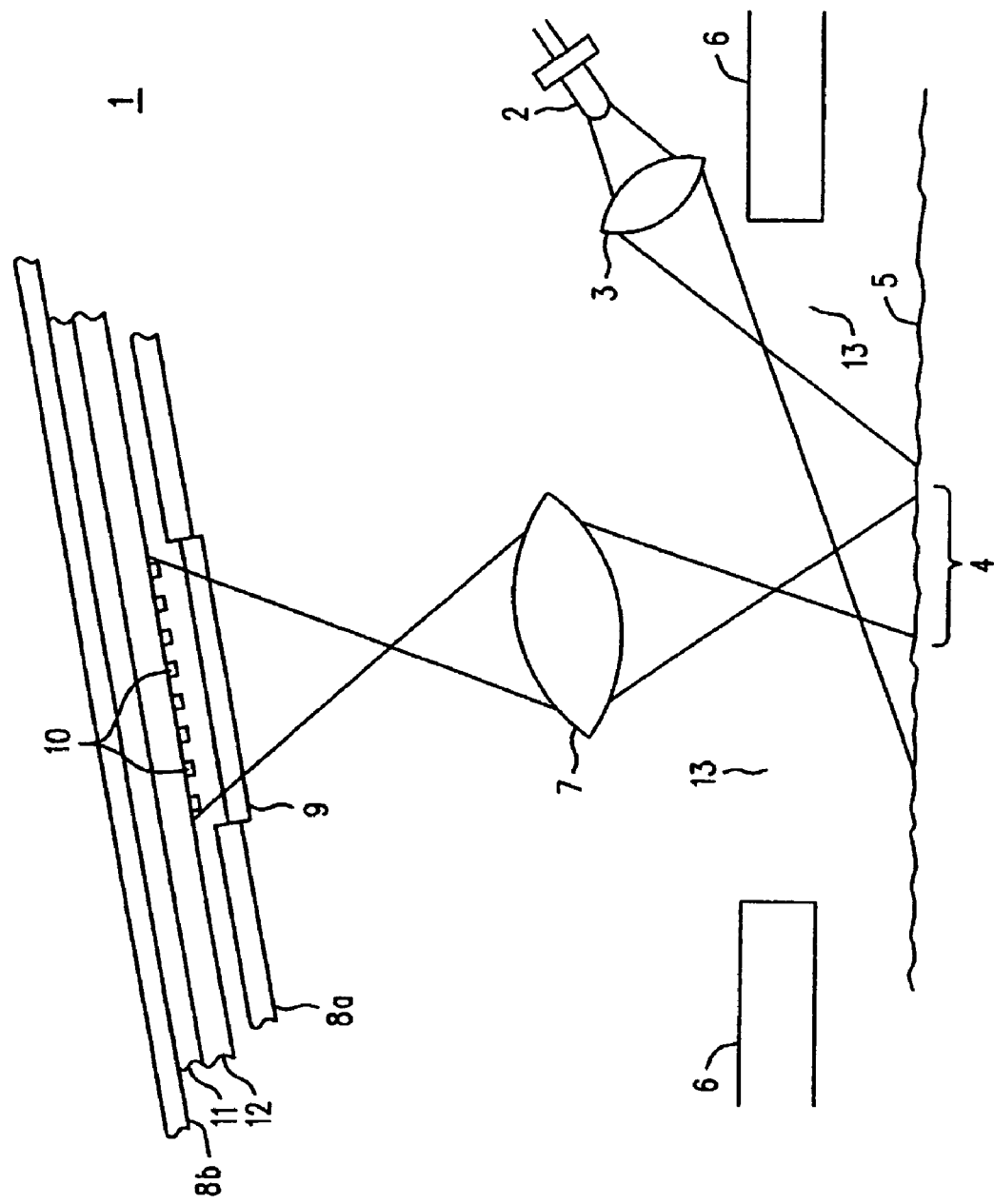
FIG. 1 is a simplified pictographic cut-away side view of a prior art imaging and navigation arrangement.

An optical mouse images as an array of pixels the spatial features of generally any micro textured or micro detailed work surface below the mouse. The photo detector responses are digitized and may be stored as a frame into memory. Motion produces successive frames of translated patterns of pixel information, which may be compared by autocorrelation to ascertain the direction and amount of movement. A hold feature suspends the production of movement signals to the computer, allowing the mouse to be physically relocated on the work surface without disturbing the position on the screen of the pointer. This may be needed if the operator runs out of room to physically move the mouse further, but the screen pointer still needs to go further. The hold feature may be implemented with an actual button, a separate proximity detector or by detecting the presence of a characteristic condition in the digitized data, such as loss of correlation or velocity in excess of a selected limit. A convenient place for an actual hold button is along the sides of the mouse near the bottom, where the thumb and the opposing ring finger grip the mouse. The gripping force used to lift the mouse engages the hold function. Hold may incorporate a brief delay upon either the release of the hold button, detection of proper proximity or the return of reasonable digitized values. During that delay any illumination control or AGC servo loops stabilize. A new reference frame may taken prior to the resumption of motion detection.

A solution to the problem of replacing a conventional mechanical mouse with an optical counterpart is to optically detect motion by directly imaging, as an array of pixels, the various particular spatial features of a work surface below the mouse, much as human vision is believed to do. In general, this work surface may be almost any flat surface; in particular, the work surface need not be a mouse pad, special or otherwise. To this end the work surface below the imaging mechanism may be illuminated from the side, say, with an infrared (IR) light emitting diode (LED). A surprisingly wide variety of surfaces create a rich collection of highlights and shadows when illuminated with a suitable angle of incidence. That angle is generally low, say, on the order of five to twenty degrees, and we shall term it a "grazing" angle of incidence. Paper, wood, formica and painted surfaces all work well; about the only surface that does not work is smooth glass (unless it is covered with fingerprints!). The reason these surfaces work is that they possess a micro texture, which in some cases may not be perceived by the unaided human senses.

IR light reflected from the micro textured surface is focused onto a suitable array (say, 16×16 or 24×24) of photo detectors. The LED may be continuously on with either a steady or variable amount of illumination servoed to maximize some aspect of performance (e.g., the dynamic range of the photo detectors in conjunction with the albedo of the work surface). Alternatively, a charge accumulation mechanism coupled to the photo detectors may be "shuttered" (by current shunting switches) and the LED pulsed on and off to control the exposure by servoing the average amount of light. Turning the LED off also saves power; an important consideration in battery operated environments. The responses of the individual photo detectors are digitized to a suitable resolution (say, six or eight bits) and stored as a frame into corresponding locations within an array of memory. Having thus given our mouse an "eye", we are going to further equip it to "see" movement by performing comparisons with successive frames.

Preferably, the size of the image projected onto the photo detectors may be a slight magnification of the original features being imaged, say, by two to four times. However, if the photo detectors are small enough it may be possible and desirable to dispense with magnification. The size of the photo detectors and their spacing may be such that there is much more likely to be one or several adjacent photo detectors per image feature, rather than the other way around. Thus, the pixel size represented by the individual photo detectors corresponds to a spatial region on the work surface of a size that is generally smaller than the size of a typical spatial feature on that work surface, which might be a strand of fiber in a cloth covering a mouse pad, a fiber in a piece of paper or cardboard, a microscopic variation in a painted surface, or an element of an embossed micro texture on a plastic laminate. The overall size of the array of photo detectors is preferably large enough to receive the images of several features. In this way, images of such spatial features produce translated patterns of pixel information as the mouse moves. The number of photo detectors in the array and the frame rate at which their contents are digitized and captured cooperate to influence how fast the seeing-eye mouse can be moved over the work surface and still be tracked. Tracking may be accomplished by comparing a newly captured sample frame with a previously captured reference frame to ascertain the direction and amount of movement. One way that may be done is to shift the entire content of one of the frames by a distance of one pixel (corresponds to a photo detector), successively in each of the eight directions allowed by a one pixel offset trial shift (one over, one over and one down, one down, one up, one up and one over, one over in the other direction, etc.). That adds up to eight trials, but we mustn't forget that there might not have been any motion, so a ninth trial "null shift" may also required. After each trial shift those portions of the frames that overlap each other are subtracted on a pixel by pixel basis, and the resulting differences are (preferably squared and then) summed to form a measure of similarity (correlation) within that region of overlap. Larger trial shifts are possible, of course (e.g., two over and one down), but at some point the attendant complexity ruins the advantage, and it is preferable to simply have a sufficiently high frame rate with small trial shifts. The trial shift with the least difference (greatest correlation) can be taken as an indication of the motion between the two frames. That is, it provides a raw F/B and L/R. The raw movement information may be scaled and or accumulated to provide display pointer movement information ($\Delta x$ and $\Delta y$) of a convenient granularity and at a suitable rate of information exchange.

The actual algorithms described in the incorporated Patents (and used by the mouse) are refined and sophisticated versions of those described above. For example, let us say that the photo detectors were a 16×16 array. We could say that we initially take a reference frame by storing the digitized values of the photo detector outputs as they appear at some time $t_0$. At some later time $t_1$ we take a sample frame and store another set of digitized values. We wish to correlate a new collection of nine comparison frames (thought to be, null, one over, one over and one up, etc.) against a version of the reference frame representing "where we were last time". The comparison frames are temporarily shifted versions of the sample frame; note that when shifted a comparison frame will no longer overlap the reference frame exactly. One edge, or two adjacent edges will be unmatched, as it were. Pixel locations along the unmatched edges will not contribute to the corresponding correlation (i.e., for that particular shift), but all the others will. And those others are a substantial number of pixels, which gives rise to a very good signal to noise ratio. For "nearest neighbor" operation (i.e., limited to null, one over, one up/down, and the combinations thereof) the correlation produces nine "correlation values", which may be derived from a summing of squared differences for all pixel locations having spatial correspondence (i.e., a pixel location in one frame that is indeed paired with a pixel location in the other frame—unmatched edges won't have such pairing).

A brief note is perhaps in order about how the shifting may be done and the correlation values obtained. The shifting may be accomplished by addressing offsets to memories that can output an entire row or column of an array at one time. Dedicated arithmetic circuitry may be connected to the memory array that contains the reference frame being shifted and to the memory array that contains the sample frame. The formulation of the correlation value for a particular trial shift (member of the nearest or near neighbor collection) is accomplished very quickly. The best mechanical analogy is to imagine a transparent (reference) film of clear and dark patterns arranged as if it were a checker board, except that the arrangement is perhaps random. Now imagine that a second (sample) film having the same general pattern is overlaid upon the first, except that it is the negative image (dark and clear are interchanged). Now the pair is aligned and held up to the light. As the reference film is moved relative to the sample film the amount of light admitted through the combination will vary according to the degree that the images coincide. The positioning that admits the least light is the best correlation. If the negative image pattern of the reference film is a square or two displaced from the image of the sample film, the positioning admits the least light will be one that matches that displacement. We take note of which displacement admits the least light; for the mouse we notice the positioning with the best correlation and say that the mouse moved that much. That, in effect, is what happens within an integrated circuit (IC) having photo detectors, memory and arithmetic circuits arranged to implement the image correlation and tracking technique we are describing.

It would be desirable if a given reference frame could be re-used with successive sample frames. At the same time, each new collection of nine (or twenty-five) correlation values (for collections at $t_1$, $t_{i-1}$, etc.) that originates from a new image at the photo detectors (a next sample frame) should contain a satisfactory correlation. For a hand held mouse, several successive collections of comparison frames can usually be obtained from the (16×16) reference frame taken at $t_0$. What allows this to be done is maintaining direction and displacement data for the most recent motion (which is equivalent to knowing velocity and time interval since the previous measurement). This allows "prediction" of how to (permanently!) shift the collection of pixels in the reference frame so that for the next sample frame a "nearest neighbor" can be expected to correlate. This shifting to accommodate prediction throws away, or removes, some of the reference frame, reducing the size of the reference frame and degrading the statistical quality of the correlations. When an edge of the shifted and reduced reference frame begins to approach the center of what was the original reference frame it may be time to take a new reference frame. This manner of operation may be termed "prediction" and could also be used with comparison frames that are 5×5 and an extended "near neighbor" (null, two over/one up, one over/two up, one over/one up, two over, one over, . . . ) algorithm. The benefits of prediction are a speeding up of the tracking process by streamlining internal correlation procedure (avoiding the comparison of two arbitrarily related 16×16 arrays of data) and a reduction of the percentage of time devoted to acquiring reference frames.

In addition to the usual buttons that a mouse generally has, the mouse may have another button that suspends the production of movement signals to the computer, allowing the mouse to be physically relocated on the work surface without disturbing the position on the screen of the pointer. This may be needed if the operator runs out of room to physically move the mouse further, but the screen pointer still needs to go further. This may happen, say, in a UNIX system employing a display system known as "Single Logical Screen" (SLS) where perhaps as many as four monitors are arranged to each display some subportion of the overall "screen". If these monitors were arranged as one high by four across, then the left to right distance needed for a single corresponding maximal mouse movement would be much wider than usually allowed for. The usual maneuver executed by the operator for, say, an extended rightward excursion, is to simply pick the mouse up at the right side of the work surface (a mouse pad, or perhaps simply the edge of clearing on an otherwise cluttered surface of his desk), set it down on the left and continue to move it to the right. What is needed is a way to keep the motion indicating signals from undergoing spurious behavior during this maneuver, so that the pointer on the screen behaves in an expected and non-obnoxious manner. The function of the "hold" button may be performed automatically by a proximity sensor on the underside of the mouse that determines that the mouse is not in contact with the work surface, or by noticing that all or a majority of the pixels in the image have "gone dark" (it's actually somewhat more complicated than that—we shall say more about this idea in the next paragraph). Without a hold feature, there may be some slight skewing of the image during the removal and replacement of the mouse, owing either: (a) to a tilting of the field of view as the mouse is lifted; or (b) to some perverse mistake where frames for two disparate and widely separated spatial features imaged at very different times during the removal and replacement are nevertheless taken as representing a small distance between two frames for the same feature. A convenient place for an actual hold button is along the sides of the mouse near the bottom, where the thumb and the opposing ring finger would grip the mouse to lift it up. A natural increase in the gripping force used to lift the mouse would also engage the hold function. A hold feature may incorporate an optional brief delay upon either the release of the hold button, detection of proper proximity or the return of reasonable digitized values. During that delay any illumination control servo loops or internal automatic gain controls would have time to stabilize and a new reference frame would be taken prior to the resumption of motion detection.

And now for this business of the pixels in the image "going dark". What happens, of course, may be that the IR light from the illuminating LED no longer reaches the photo detectors in the same quantity that it did, if at all; the reflecting surface may be too far away or may be simply not in view. However, if the mouse were turned over, or its underside exposed to an intensely lit environment as a result of its being lifted, then the outputs of the photo detectors might be at any level. The key is that they will be uniform, or nearly so. The main reason that they become uniform is that there is no longer a focused image; all the image features are indistinct and they are each spread out over the entire collection of photo detectors. So the photo detectors uniformly come to some average level. This is in distinct contrast with the case when there is a focused image. In the focused case the correlations between frames (recall the one over, one over and one down, etc.) exhibit a distinct phenomenon.

Assume that the spatial features being tracked mapped exactly onto the photo detectors, through the lens system, and that mouse movement were jerky by exactly the amount and in the directions needed for a feature to go from detector to detector. Now for simplicity assume also that there is only one feature, and that its image is the size of a photo detector. So, all the photo detectors but one are all at pretty much the same level, and the one detector that is not at that level is at a substantially different level, owing to the feature. Under these highly idealized conditions it is clear that the correlations will be very well behaved; eight "large" differences and one small difference (a sink hole in an otherwise fairly flat surface) in a system using nine trials for a nearest neighbor algorithm (and remembering that there may have been no motion). Note: The astute reader will notice that the "large" difference in this rather contrived example actually corresponds to, or originates with, only one pixel, and probably does not deserve to be called "large"—recall the earlier shifted film analogy. The only light passed by the films for this example would be for the one pixel of the feature. A more normal image having a considerably more diverse collection of pixels increases the difference to where it truly is a "large" difference.

Now, such highly idealized conditions are not the usual case. It is more normal for the image of the tracked spatial features to be both larger and smaller than the size of the photo detectors, and for the mouse motion to be continuous, following a path that allows those images to fall onto more than one detector at once. Some of the detectors will receive only a partial image, which is to say, some detectors will perform an analog addition of both light and dark. The result may be at least a "broadening" of the sink hole (in terms of the number of photo detectors associated with it) and very possibly a corresponding decrease in the depth of the sink hole. The situation may be suggested by imagining a heavy ball rolling along a taut but very stretchable membrane. The membrane has a discrete integer Cartesian coordinate system associated with it. How much does the membrane distend at any integer coordinate location as the ball rolls? First imagine that the ball is of a very small diameter but very heavy, and then imagine that the ball is of a large diameter, but still weighs the same. The analogy may not be exact, but it serves to illustrate the idea of the "sink hole" mentioned above. The general case is that the generally flat surface with sharply defined sink hole becomes a broad concavity, or bowl.

We shall term the surface produced or described by the various correlation values the "correlation surface" and will, at various times, be most interested in the shape of that surface.

We say all of this to make two points. First, the shifting shape of the concavity in the correlation surface as the mouse moves allows interpolation to a granularity finer than the simple size/spacing of the photo detectors. We point this out, with the remark that our mouse can do that, and leave it at that. The full details of interpolation are described in the incorporated Patents. No further discussion of interpolation is believed necessary. Second, and this is our real reason for the discussion of the preceding paragraphs, is the observation that what happens when the mouse is picked up is that the concavity in the correlation surface goes away, to be replaced by generally equal values for the correlations (i.e., a "flat" correlation surface). It is when this happens that we may say with considerable assurance that the mouse is air borne, and can then automatically invoke the hold feature, until after such time that a suitable concavity ("bowl") reappears.

Another method for invoking or initiating a hold feature is to simply notice that the mouse is moving faster than a certain threshold velocity (and is thus presumably experiencing an abrupt retrace motion in a maneuver intended to translate the screen pointer further than the available physical space within which the mouse is operating). Once the velocity threshold is exceeded the motion indicating signals that would otherwise be associated with that movement are suppressed until such time as the velocity drops below a suitable level.

Refer now to FIG. 1, wherein is shown a simplified representation of a cut-away side view of a prior art imaging and navigation arrangement 1 that is generally of the type described by the incorporated patents. An LED 2, which may be an IR LED, emits light which is projected by lens 3 (which instead of being separate may be an integral part of the LED's package), through orifice 13 in bottom surface 6 and onto a region 4 that is part of a work surface 5. The average angle of incidence is preferably within the range of five to twenty degrees. Although it has been omitted for clarity, the orifice 13 might include a window that is transparent for the light from LED 2, and which would serve to keep dust, dirt or other contamination out of the innards of the seeing eye mouse. Work surface 5 might belong to a special object, such as a mouse pad, or more generally, it will not, and might be the surface of nearly anything except smooth glass. Examples of suitable materials include, but are not limited to, paper, cloth, laminated plastic tops, painted surfaces, frosted glass (smooth side down, thank you), desk pads, real wood, fake wood, etc. Generally, any micro textured surface having features whose size falls within the range of 5 to 500 microns will do.

The illumination of micro textured surfaces is most effective when done from the side, as this accentuates the pattern of highlights and shadows produced by surface height irregularities. Suitable angles of incidence for illumination cover the range of about five to twenty degrees. A very smooth or flat surface (e.g., one that has been ground and polished) having simple variations in reflectivity owing to (micro scale) compositional variation works, too. In such a case (and assuming that it can be guaranteed) the angle of incidence for the illumination could approach ninety degrees, since the urge to create shadows goes away. However, such a smooth yet micro detailed surface is not what we would ordinarily think of when we say "arbitrary surface", and a seeing eye mouse intended for use on an "arbitrary surface" that is more likely micro textured would work best if equipped to provide a grazing angle of incident illumination.

An image of the illuminated region 4 is projected through an optical window 9 in package portion 8a of an integrated circuit and onto an array 10 of photo detectors. This is done with the aid of lens 7. The package portion 8a might also dispense with separate window 9 and lens 7 by combining them into one and the same element. The photo detectors may comprise a square array of, say, 12 to 24 detectors on a side, each detector being a photo transistor whose photo sensitive region is 45 by 45 microns and of 60 microns center to center spacing. The photo transistors charge capacitors whose voltages are subsequently digitized and stored in a memory. The array 10 is fabricated onto a portion of an integrated circuit die 12 affixed by an adhesive 11 onto package portion 8b. What is not shown are any of the details of how the integrated circuit is held in place (probably by a printed circuit board), the shape or composition of the lenses, or of how the lenses are mounted; it is clear that those things are doable in a conventional manner. It is also clear that the general level of illumination of region 4 may be controlled by noticing the output levels of the photo detectors and adjusting the intensity of light issuing from the LED 2. This could be either continuous control or pulse width modulation, or some combination of both. Once again, the reader is reminded that the details of the motion sensing operation are thoroughly described in the incorporated patents (and briefly described in the Summary); accordingly, they need not be repeated here.

Figure 2:
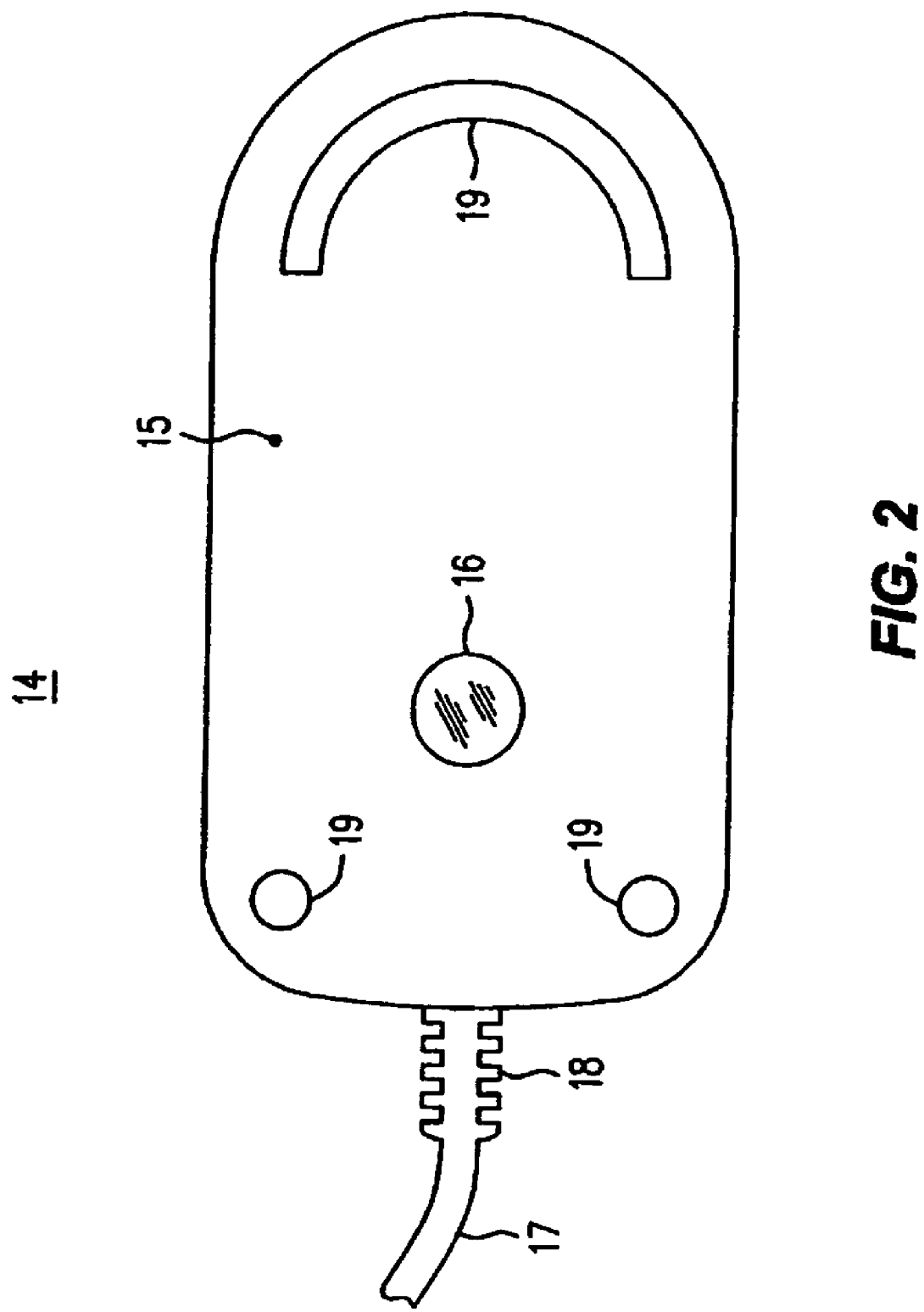
FIG. 2 is a bottom view of a mouse constructed in accordance with the invention.

Refer now to FIG. 2, which is a bottom view of a mouse 14 constructed in accordance with the invention. In short, this bottom view of this particular seeing eye mouse 14 looks very similar to the bottom view of a particular conventional mouse from Hewlett-Packard Co., to wit: the C1413A. The major difference is that where there ought to be a ball there is a protective lens or window 16 that is transparent to IR light. This is the omitted transparent window in orifice 13 that was mentioned in the description of FIG. 1. Also missing is the usual rotatable annulus that serves as a removable retainer to allow access to the ball for cleaning or replacement. What is shown in the figure is the underside 15 of the mouse 14 (corresponds to 6 in FIG. 1), low friction glides 19 and connecting cable 17 with its strain relief 18. Of course, our seeing eye mouse 14 could be a cordless mouse, as well, with an optical or radio communication link to the computer.

Figure 3:
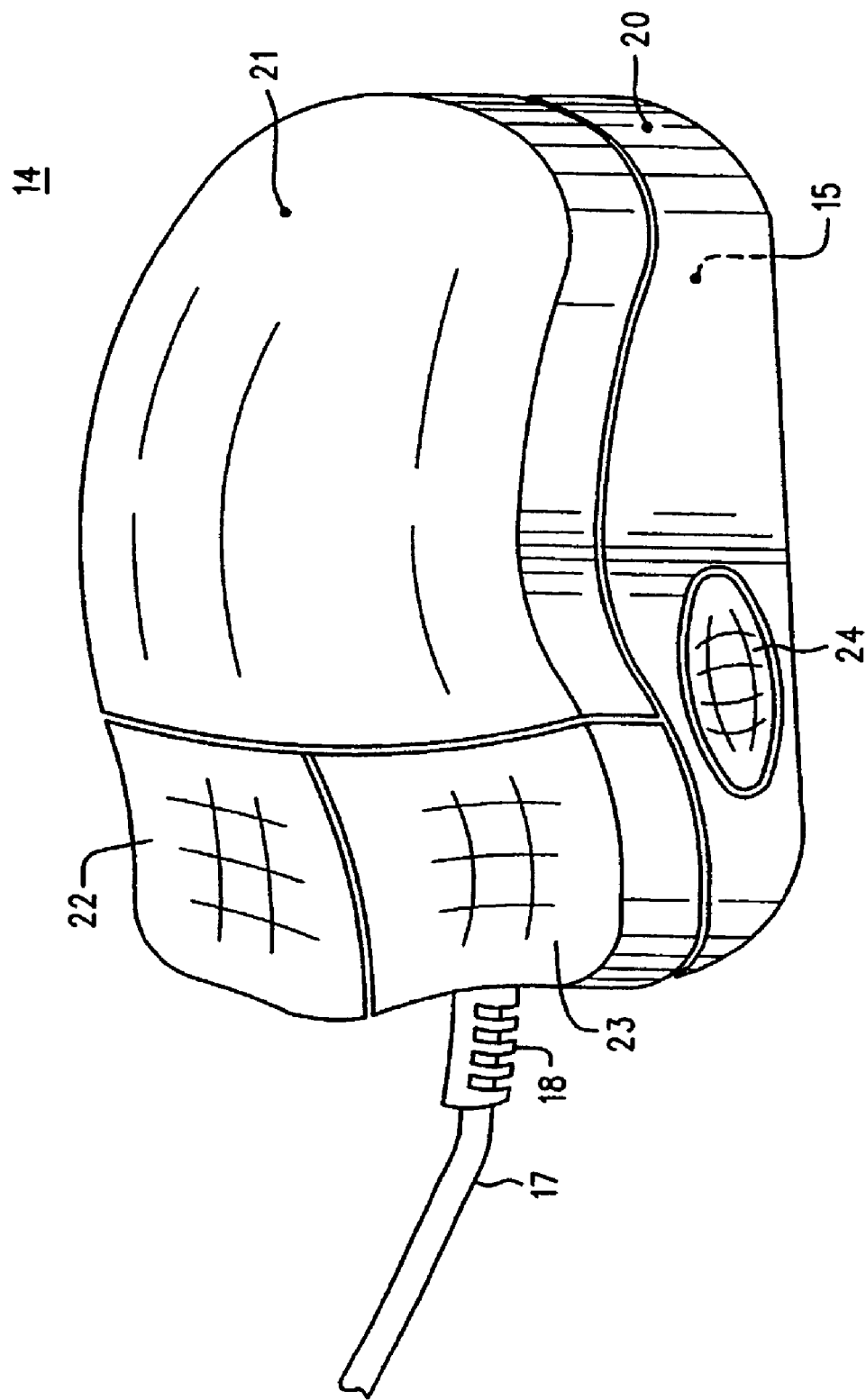
FIG. 3 is a side perspective view of a mouse constructed in accordance with one aspect of the invention.

Refer now to FIG. 3, wherein is shown a side perspective view of a mouse 14 constructed in accordance with one aspect of the invention. That aspect of the invention is the hold feature. The hold feature is an aspect of seeing eye mouse operation that suspends the production of movement information or signals to the computer when it is determined that the mouse is not suitably proximate to the work surface whose spatial features are being tracked. This allows the seeing eye mouse to be picked up, translated and set back down, or, as we shall term such an operation, "swiped" across the work surface.

In particular, the seeing eye mouse 14 in FIG. 3 includes at least one hold button 24 located in side skirt 20 near the bottom surface 15 so as to be beneath the right thumb or the left ring finger, depending upon which hand the operator is using. There may be another symmetrically located button on the other side (not shown) that would contact either the left thumb or the right ring finger.

The mouse 14 conventionally includes a surface 21 which nestles in the palm of the hand, and first and second "regular" mouse buttons 22 and 23 that are actuated by the index and middle fingers. These operate in their normal fashion.

Button or buttons 24 are activated by a natural increase in the gripping force needed to pick the mouse 14 up during a swipe. When one or both of these button are pressed the hold feature is activated. For the duration of the hold the sending of motion signals to the computer is suspended. When the hold is over (the buttons are released) a new reference frame is taken before any new motion signals are sent to the computer. This allows swiping, and has the advantage that the user has the ability to expressly force the onset of the hold feature.

Figure 4:
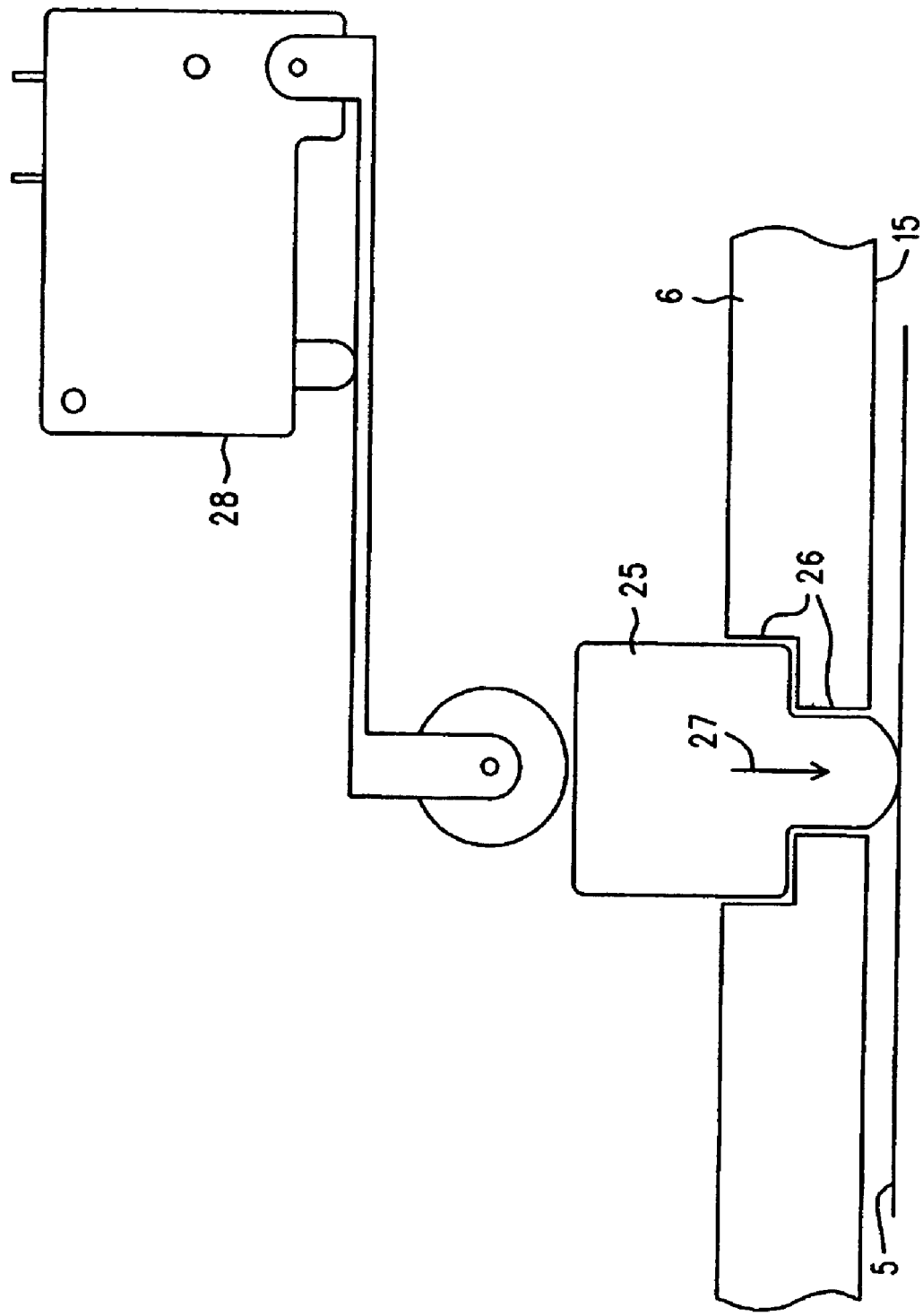
FIG. 4 is a simplified side cut-away view of a proximity sensor in the base of the mouse of FIGS. 2 and 3 and used to automatically activate a hold feature.

The hold feature could also be automatically activated by the action of a separate proximity sensor on the bottom of the mouse. This is what is shown in FIG. 4, where a shouldered aperture 26 in the base 6 receives a shouldered plunger 25 made captive by the lever arm of a switch 28 above. The switch 28 is activated by movement of the plunger 25, such that when the plunger moves significantly in the direction of arrow 27 the hold feature is activated. The exact nature of the separate proximity sensor is a matter of choice, and while it could be a simple as the micro switch 28 operated by the weight of the mouse through the plunger 25, other, non-mechanical, methods are also possible.

Yet another way to automatically activate and deactivate the hold feature is to examine the nature of the digitized data of the array 10 of photo detectors. When the outputs of the photo detectors become sufficiently uniform it may be surmised that there is no longer an image with variations projected onto the array 10 of photo detectors. This uniformity will reveal itself by producing a correlation surface that is flat, or nearly so. Rather than separately detecting uniform levels (which would use hardware not otherwise present), we prefer instead to examine the shape of the correlation surface, (which surface we need for other reasons, anyway). The most probable cause of a flat correlation surface is that the mouse has been picked up. This mode of operation may require that there be a fairly narrow depth of field, lest there occur undue delay in activating the hold. Such delay could produce minor artifacts in screen pointer movement. These might include slight unintended screen pointer movements owing to tilting of the mouse as it is either picked up or replaced. As long as activating the hold feature (however done, whether manually or automatically) forces acquisition of a new reference frame before resuming the production of motion signals, there should be no danger of producing a spurious indication resulting from the combination of old data with some new data that just accidentally looks like a proper small motion in some inappropriate direction. However, with mere uniform level detection (of, say, a sample frame) it may be difficult to guarantee that while in motion in the air there occur no optical effects (a reflection of a bright source) that would confuse the algorithm. It will be appreciated that the shape of the correlation surface is a much more reliable indicator. All of that said, it must still be remembered that the steering, as it were, of the screen pointer is an incrementally driven servo-like operation performed by a human being; if the screen pointer isn't there yet, just keep moving the mouse as needed! Small perturbations during swiping are not fatal, and may not even be particularly noticeable, depending upon the specific application being performed.

Figure 5:
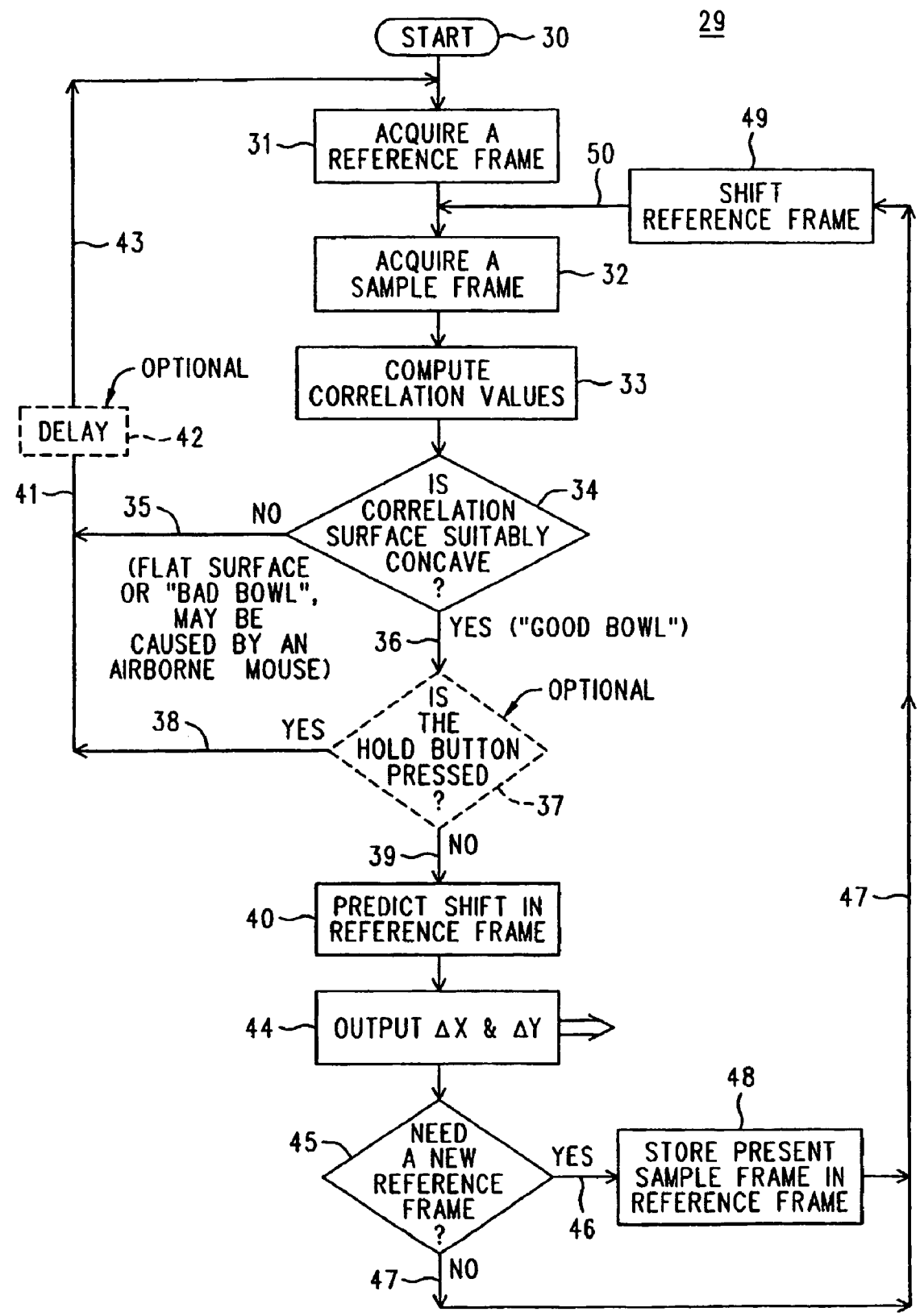
FIG. 5 is a simplified flow chart describing an aspect of internal seeing eye mouse operation related to the operation of the hold feature when used in conjunction with a feature called prediction.

Refer now to FIG. 5, wherein is shown a flow chart 29 that describes an aspect of seeing eye mouse operation involving the hold and prediction properties. We may assume that there is some start condition or location 30, from which is reached step 31: ACQUIRE A REFERENCE FRAME. This refers to illuminating the LED 2 and storing a collection of digitized photo detector values into an array of memory (not shown). The next step 32 is ACQUIRE A SAMPLE FRAME. This refers to the same actions, except that the data is stored in a different array of memory, and may reflect mouse motion relative to where it was when step 31 was performed. At step 33, COMPUTE CORRELATION VALUES, the nine (or perhaps twenty-five) correlation values are quickly computed by some heavy duty dedicated arithmetic hardware assisted by automatic address translation and a very wide path out of the memory arrays. At step 34, IS THE CORRELATION SURFACE SUITABLY CONCAVE?, the nature of the correlation surface described by the collection of correlation values computed in step 33 is examined. We want to know if it is shaped like a bowl, and if so, "how much water will it hold," so to speak.

If the shape of the correlation surface is a good bowl, then path 36 takes us to the optional step 37: IS THE HOLD BUTTON PRESSED?; more about that in the next paragraph. Otherwise, we have a flat correlation surface, or a "bad bowl," and proceed along path 35 to optional step 42, DELAY. There are several possible causes for this exit from qualifier 34: e.g., extreme velocity, a suddenly featureless work surface, and, an airborne mouse. In the absence of an explicit HOLD button, we will rely upon exit path 35 to provide proper seeing eye mouse behavior by suppressing motion signals to the computer during the airborne portion of a swiping operation.

If the seeing eye mouse does have a HOLD button, then optional qualifier 37 is present, and it is there that the status dressed or not) of the HOLD 24 button is determined. The case where it is pressed is treated the same as that for a bad bowl at qualifier 34. That is, path 38 is taken, which also leads to optional step 42.

Optional step 42 provides a delay which may be useful in several ways. First, if there is a swipe in progress, then it takes some time, and by not imagining during that time some battery power can be saved. Also, suppose that the nature of the delay is slightly more complex than a pause in the motion of a moving finger on the flow chart. Suppose that the ACQUIRE REFERENCE FRAME step 31 were influenced by there having been a delay at step 42, in that part way through the delay an illumination level control operation is initiated. This could allow time for re-adjustment of illumination levels, and so forth. Whether or not there is a DELAY at optional step 42, path 43 leads back to step 31, where another motion detection cycle begins.

To resume, path 39 leads to step 40: PREDICT SHIFT IN REFERENCE FRAME. As mentioned above, it is generally not necessary to obtain and maintain actual velocities in X and Y, and time interval information, to find the displacement needed for prediction. One can imagine measurement environments where that might be needed, but the one shown here is not one of them. Instead, the predicted shift can be taken as the amount of movement corresponding to the correlation at the preceding step 34.

The next step 44 is OUTPUT $\Delta X$ & $\Delta Y$. It is here that we take note of how much mouse motion there has been since the last measurement cycle. The amount of shift needed to attain correlation is the desired amount These values may be found by noticing which comparison frame actually correlated (assuming no interpolation). These "raw" $\Delta X$ and $\Delta Y$ motion values may be accumulated into running values that are sent to the computer at a lower rate than that at which the raw values of step 44 are produced.

At qualifier 45 we ask if we NEED A NEW REFERENCE FRAME?. If the answer is YES, then path 46 leads to step 48: STORE PRESENT SAMPLE FRAME IN REFERENCE FRAME. (A little thought will confirm that this re-use of the sample frame cooperates with not having to maintain actual velocities and time intervals for the prediction process. If we took a separate new reference frame it would complicate a lot of things, and would probably force the use of D=RT—i.e., the distance formula—for prediction.)

We need a new reference frame when there has been enough shifting of it, owing to predictions, that not enough of it overlaps the comparison frames for reliable correlations. Somewhere in the range of three to five shifts (that do not retrace themselves) is about the limit for a 16×16 reference frame.

If the answer to qualifier 45 is NO, and we do not need to replace the reference frame, then path 47 takes us to the same step 49 as does the path leading from step 48. Step 49, SHIFT REFERENCE FRAME, performs the actual permanent shift of the values in the memory array representing the reference frame. The shift is by the prediction amount, and data shifted away is lost. Following the shifting of the reference frame path 50 returns to step 32, ACQUIRE A SAMPLE FRAME, where the next measurement cycle begins.

Figure 6:
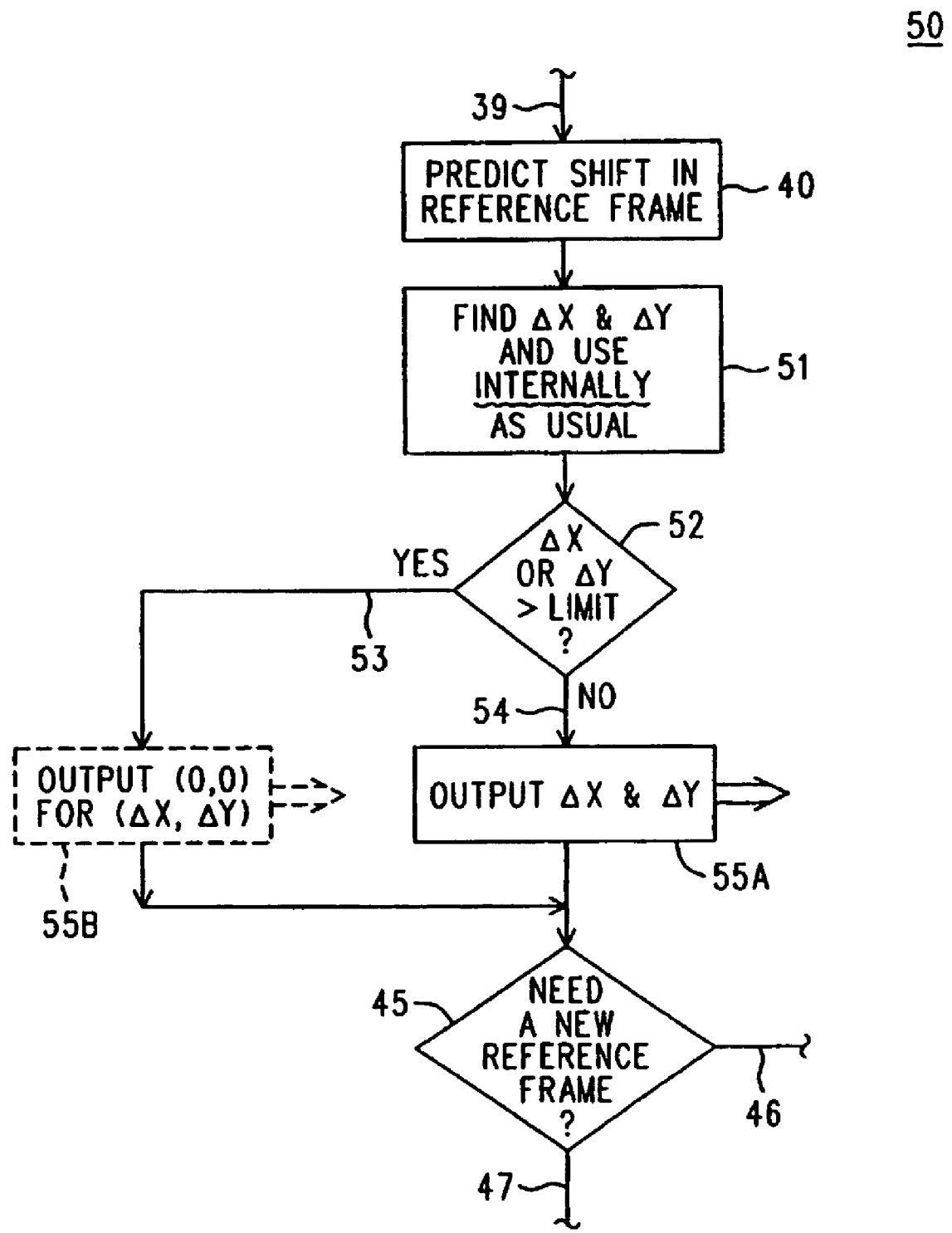
FIG. 6 is a simplified portion of a modification of the flow chart of FIG. 5 and illustrates the velocity detection method of invoking the hold feature.

Refer now to FIG. 6, wherein is shown a simplified flow chart segment 50 that shows how to replace step 44 of the flow chart 29 in FIG. 5 with steps 51-55. The purpose for doing this is similar to the various manners of hold operation already described, and may be used in conjunction therewith, or instead thereof. The general idea of the modification represented by FIG. 6 is to outfox the computer by either not sending any updated information by skipping step 55A or (optionally, with step 55B) sending zeros for $\Delta X$ and $\Delta Y$, even when that is not true. This is done whenever step 52 ascertains that the rate of mouse motion exceeds, say, three to six inches per second. For a given seeing eye mouse such a limit is easily expressed as a displacement by a certain number of pixels within some number of measurement cycles, assuming that the measurement cycle rate is fast compared to normal mouse motion. The idea is that normal casual mouse motion probably will not require either a new nearest neighbor reference frame (let alone a maximally shifted one for 5×5 near neighbor operation) every measurement cycle for some large (say, ten to twenty-five) number of consecutive measurement cycles. For if that were the case, the seeing eye mouse would be operating on the hairy edge of the hold mode via a NO answer to qualifier 34 and path 35. (According to the assumption, any higher velocity will result in loss of correlation!) That is, the expectation is that taking a new reference frame is normally much less frequent. Of course, it could happen that the velocity of the mouse is really high, and path 35 gets used, anyway. That is as it should be. But if the measurement cycle rate is not sufficiently high with respect to normal expected mouse motion, then it might not be appropriate to use the technique of FIG. 6.

Step 51 represents anything in the old step 44 over and above the actual communication to the computer of the values $\Delta X$ and $\Delta Y$. A tricky example of this difference might be an internal accumulation of motion that has not yet be dispatched to the computer, owing to a higher internal motion measurement cycle rate for the seeing eye mouse than the information exchange rate with the computer. Now, it may well be the case that in some systems this accumulated information is used for internal mouse purposes other than strictly for keeping the computer informed. If so, then it would need to be preserved, for all that qualifier 52, path 53 (and bypassed step 55A) need to accomplish is NOT tell the computer there has been motion; we want to fool the computer but without making the mouse lose its mind.

It will be noticed that if such an accumulation were allowed to continued during a rapid retrace, intended to mimic picking the mouse up, the computer might still win in the end when the velocity drops to normal amounts and the accumulation is finally sent; the screen cursor could snap to the correct location, anyway, depending upon how the overall system works. In such a case a separate set of accumulations should be maintained, with those for the computer remaining in bypassed step 55A.

Of course, it may be the case that there is no internal use by the mouse of accumulated $\Delta X$ and $\Delta Y$, other than to send it to the computer. In that case nothing needs to be done, other than to leave that accumulation in bypassed step 55A. It is also possible that in the mouse there simply are no accumulations to cause such concerns; say, any such accumulations were done by software in the computer.

Figure 7:
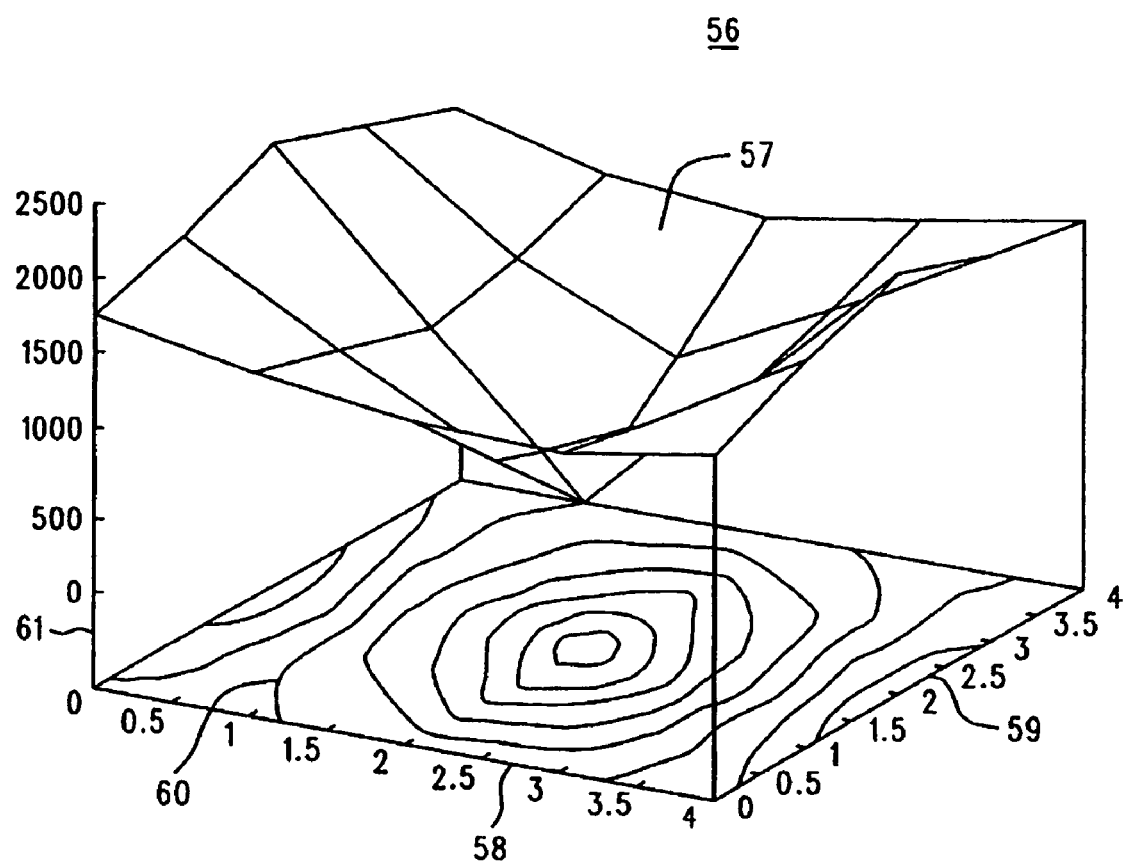
FIG. 7 is a perspective view of a plotted correlation surface that has good concavity.

Finally, refer now to FIG. 7. It is a plot 56 of a near neighbor (5×5) correlation surface 57 having a suitable concavity. The two horizontal axes 58 and 59 represent the X and Y axes of mouse motion; the units indicated along the axes are pixels. Drawn onto the plane of the axes 58 and 59 are smoothed and interpolated contour lines 60 intended to further indicate the shape of the correlation surface directly above. The vertical axis 61 a measure of correlation expressed in essentially arbitrary units.

We claim:

1. A hand operated pointing device for use with a computer, comprising:
    a movable housing;
    a source of non-coherent light illuminating a work surface; and
    circuitry in the movable housing using a plurality of two dimensional arrays of data related to light reflected by the illuminated work surface to produce a first plurality of values by processing at least a portion of a first array of the plurality of arrays of data with a plurality of portions of a second array of the plurality of arrays of data, the circuitry processes the first plurality of values to identify a value representing a valid first movement of the housing relative to the work surface, wherein the circuitry derives a prediction of a second movement from the identified value.

2. The invention of claim 1, wherein the circuitry selects one of a portion of the first array and a third array of the plurality of arrays in accordance with the prediction to produce a second plurality of values.

3. The invention of claim 2, wherein the circuitry processes the values of the second plurality of values and provides a signal to the computer related to a valid second movement only if a value related to a valid second movement is identified.

4. The invention as in claim 3 wherein a selected portion of the first array is processed to produce the first plurality of values.

5. The invention as in claim 3, wherein the circuitry produces the first plurality of values by correlation.

6. The invention as in claim 3, wherein the circuitry identifies a value representing a valid first movement by comparing the values.

7. The invention as in claim 3, wherein the circuitry produces the first plurality of values by correlation and identifies a value related to a valid first movement by comparing the correlation results.

8. The invention as in claim 3, wherein the circuitry identifies a value representing a valid first movement if that value is not sufficiently uniform in value with the other values in the first plurality of values to indicate invalid data.

9. The invention as in claim 3, wherein the circuitry does not identify a value representing a valid first movement if the values are sufficiently uniform.

10. The invention as in claim 3, wherein the first plurality of values represents an array of values and the circuitry identifies a value representing a valid first movement by analysis of surrounding values in the array of values.

11. The invention as in claim 3, wherein the prediction is related to the first valid movement.

12. The invention as in claim 3, wherein the circuitry selects the third array to produce the second plurality of values if the predicted movement exceeds a maximum value.

13. The invention as in claim 3, wherein the circuitry selects the third array to produce the second plurality of values if the prediction exceeds a value related to the position of the portion of first array used to produce the first plurality of values.

14. The invention as in claim 3, wherein the circuitry suspends sending signals related to the then current movement of the housing if no value related to a valid movement is identified.

15. The invention as in claim 3, wherein the circuitry sends signals not related to the then current second movement if a value related to a valid second movement is not identified.

16. The invention as in claim 3, wherein the circuitry suspends sending signals related to a valid current movement of the housing if the plurality of portions of the second array are sufficiently uniform to indicate invalid data.

17. The invention as in claim 3, wherein the source of light further comprises:
a source of non-coherent light illuminating surface irregularities on the work surface at an angle of incidence sufficiently low to produce suitable arrays of data.

18. The invention as claim 2, wherein the prediction is related to the first valid movement.

19. The invention as in claim 2, wherein the circuitry selects the third array to produce the second plurality of values if the predicted movement exceeds a maximum value.

20. The invention as in claim 2, wherein the circuitry selects the third array to produce the second plurality of values if the prediction exceeds a value related to the position of the portion of first array used to produce the first plurality of values.

21. The invention as in claim 2, wherein the circuitry sends signals not related to the then current second movement if a value related to a valid second movement is not identified.

22. The invention as in claim 2 wherein a selected portion of the first array is processed to produce the first plurality of values.

23. The invention as in claim 2, wherein the circuitry produces the first plurality of values by correlation.

24. The invention as in claim 2, wherein the circuitry identifies a value representing a valid first movement by comparing the values.

25. The invention as in claim 2, wherein the circuitry produces the first plurality of values by correlation and identifies a value related to a valid first movement by comparing the correlation results.

26. The invention as in claim 2, wherein the circuitry identifies a value representing a valid first movement if that value is not sufficiently uniform in value with the other values in the first plurality of values to indicate invalid data.

27. The invention as in claim 2, wherein the circuitry does not identify a value representing a valid first movement if the values are sufficiently uniform.

28. The invention as in claim 2, wherein the first plurality of values represents an array of values and the circuitry identifies a value representing a valid first movement by analysis of surrounding values in the array of values.

29. The invention as in claim 2, wherein the circuitry suspends sending signals related to the then current movement of the housing if no value related to a valid movement is identified.

30. The invention as in claim 2, wherein the circuitry suspends sending signals related to a valid current movement of the housing if the plurality of portions of the second array are sufficiently uniform to indicate invalid data.

31. The invention as in claim 2, wherein the source of light further comprises:
a source of non-coherent light illuminating surface irregularities on the work surface at an angle of incidence sufficiently low to produce suitable arrays of data.

32. The invention of claim 1, wherein the circuitry selects one of a portion of the first array and a third array of the plurality of arrays in accordance with the identified value to produce a second plurality of values.

33. The invention of claim 32, wherein the circuitry processes the second plurality of values to send a signal to the computer related to a valid second movement.

34. The invention as in claim 33 wherein a selected portion of the first array is processed to produce the first plurality of values.

35. The invention as in claim 33, wherein the circuitry produces the first plurality of values by correlation.

36. The invention as in claim 33, wherein the circuitry identifies a value representing a valid first movement by comparing the values.

37. The invention as in claim 33, wherein the circuitry produces the first plurality of values by correlation and identifies a value related to a valid first movement by comparing the correlation results.

38. The invention as in claim 33, wherein the circuitry identifies a value representing a valid first movement if that value is not sufficiently uniform in value with the other values in the first plurality of values to indicate invalid data.

39. The invention as in claim 33, wherein the circuitry does not identify a value representing a valid first movement if the values are sufficiently uniform.

40. The invention as in claim 33, wherein the first plurality of values represents an array of values and the circuitry identifies a value representing a valid first movement by analysis of surrounding values in the array of values.

41. The invention as in claim 33, wherein the circuitry selects the third array to produce the second plurality of values if the prediction exceeds a value related to the position of the portion of first array used to produce the first plurality of values.

42. The invention as in claim 33, wherein the circuitry suspends sending signals related to the then current movement of the housing if no value related to a valid movement is identified.

43. The invention as in claim 33, wherein the circuitry sends signals not related to the then current second movement if a value related to a valid second movement is not identified.

44. The invention as in claim 33, wherein the circuitry suspends sending signals related to a valid current movement of the housing if the plurality of portions of the second array are sufficiently uniform to indicate invalid data.

45. The invention as in claim 33, wherein the source of light further comprises:
a source of non-coherent light illuminating surface irregularities on the work surface at an angle of incidence sufficiently low to produce suitable arrays of data.

46. The invention as in claim 32 wherein a selected portion of the first array is processed to produce the first plurality of values.

47. The invention as in claim 32, wherein the circuitry produces the first plurality of values by correlation.

48. The invention as in claim 32, wherein the circuitry identifies a value representing a valid first movement by comparing the values.

49. The invention as in claim 32, wherein the circuitry produces the first plurality of values by correlation and identifies a value related to a valid first movement by comparing the correlation results.

50. The invention as in claim 32, wherein the circuitry identifies a value representing a valid first movement if that value is not sufficiently uniform in value with the other values in the first plurality of values to indicate invalid data.

51. The invention as in claim 32, wherein the circuitry does not identify a value representing a valid first movement if the values are sufficiently uniform.

52. The invention as in claim 32, wherein the first plurality of values represents an array of values and the circuitry identifies a value representing a valid first movement by analysis of surrounding values in the array of values.

53. The invention as in claim 32, wherein the circuitry suspends sending signals related to the then current movement of the housing if no value related to a valid movement is identified.

54. The invention as in claim 32, wherein the circuitry suspends sending signals related to a valid current movement of the housing if the plurality of portions of the second array are sufficiently uniform to indicate invalid data.

55. The invention as in claim 32, wherein the source of light further comprises:
a source of non-coherent light illuminating surface irregularities on the work surface at an angle of incidence sufficiently low to produce suitable arrays of data.

56. The invention of claim 1, wherein the circuitry sends a signal to the computer related to the valid first movement.

57. The invention as in claim 56 wherein a selected portion of the first array is processed to produce the first plurality of values.

58. The invention as in claim 56, wherein the circuitry produces the first plurality of values by correlation.

59. The invention as in claim 56, wherein the circuitry identifies a value representing a valid first movement by comparing the values.

60. The invention as in claim 56, wherein the circuitry produces the first plurality of values by correlation and identifies a value related to a valid first movement by comparing the correlation results.

61. The invention as in claim 56, wherein the circuitry identifies a value representing a valid first movement if that value is not sufficiently uniform in value with the other values in the first plurality of values to indicate invalid data.

62. The invention as in claim 56, wherein the circuitry does not identify a value representing a valid first movement if the values are sufficiently uniform.

63. The invention as in claim 56, wherein the first plurality of values represents an array of values and the circuitry identifies a value representing a valid first movement by analysis of surrounding values in the array of values.

64. The invention as in claim 56, wherein the circuitry suspends sending signals related to the then current movement of the housing if no value related to a valid movement is identified.

65. The invention as in claim 56, wherein the circuitry suspends sending signals related to a valid current movement of the housing if the plurality of portions of the second array are sufficiently uniform to indicate invalid data.

66. The invention as in claim 56, wherein the source of light further comprises:
a source of non-coherent light illuminating surface irregularities on the work surface at an angle of incidence sufficiently low to produce suitable arrays of data.

67. The invention as in claim 1 wherein a selected portion of the first array is processed to produce the first plurality of values.

68. The invention of claim 67 wherein the first array is reused to produce subsequent pluralities of values by selection of a second selected portion of the first array.

69. The invention as in claim 1, wherein the circuitry produces the first plurality of values by correlation.

70. The invention as in claim 1, wherein the circuitry identifies a value representing a valid first movement by comparing the values.

71. The invention as in claim 1, wherein the circuitry produces the first plurality of values by correlation and identifies a value related to a valid first movement by comparing the correlation results.

72. The invention as in claim 1, wherein the circuitry identifies a value representing a valid first movement if that value is not sufficiently uniform in value with the other values in the first plurality of values to indicate invalid data.

73. The invention as in claim 1, wherein the circuitry does not identify a value representing a valid first movement if the values are sufficiently uniform.

74. The invention as in claim 1, wherein the first plurality of values represents an array of values and the circuitry identifies a value representing a valid first movement by analysis of surrounding values in the array of values.

75. The invention as in claim 1 wherein the circuitry suspends sending signals related to the then current movement of the housing if no value related to a valid movement is identified.

76. The invention as in claim 1, wherein the circuitry suspends sending signals related to a valid current movement of the housing if the plurality of portions of the second array are sufficiently uniform to indicate invalid data.

77. The invention as in claim 1, wherein the source of light further comprises:
a source of non-coherent light illuminating surface irregularities on the work surface at an angle of incidence sufficiently low to produce suitable arrays of data.

78. The invention of claim 77 wherein the angle of incidence is a grazing angle.

79. The invention of claim 77 wherein the angle of incidence between about 5° and about 20°.

80. A hand operated pointing device for use with a computer, comprising:
a movable housing;
circuitry in the movable housing using a plurality of two dimensional arrays of data related to light reflected from a work surface to produce a first plurality of values by processing a selected first portion of a first array of the plurality of arrays with a plurality of portions of a second array of the plurality of arrays, the circuitry processes the first plurality of values to identify a value representing a valid first movement of the housing relative to the work surface; and
a source of non-coherent light illuminating surface irregularities on the work surface at an angle of incidence low enough to produce suitable arrays of data for processing from highlights and shadows of the illuminated surface irregularities;

wherein the circuitry derives a prediction of a second movement from the identified value.

81. The invention of claim 80 wherein the circuitry analyzes the prediction of a second movement in accordance with the selected first portion of the first array in order to select one of a second portion of the first array and a third array of the plurality of arrays to process with portions of a fourth array of the plurality of arrays to produce a second plurality of values.

82. The invention of claim 81 wherein the circuitry processes the values of the second plurality of values and provides a signal to the computer related to a valid second movement only if a value related to a valid second movement is identified.

83. The invention as in claim 82, wherein the circuitry produces the first plurality of values by correlation.

84. The invention as in claim 82, wherein the circuitry identifies a value representing a valid first movement by comparing the values.

85. The invention as in claim 82, wherein the circuitry produces the first plurality of values by correlation and identifies a value related to a valid first movement by comparing the correlation results.

86. The invention as in claim 82, wherein the circuitry identifies a value representing a valid first movement if that value is not sufficiently uniform in value with the other values in the first plurality of values to indicate invalid data.

87. The invention as in claim 82, wherein the circuitry does not identify a value representing a valid first movement if the values are sufficiently uniform.

88. The invention as in claim 82, wherein the first plurality of values represents an array of values and the circuitry identifies a value representing a valid first movement by analysis of surrounding values in the array of values.

89. The invention as in claim 82, wherein the prediction is related to the first valid movement.

90. The invention as in claim 82, wherein the circuitry selects the third array to produce the second plurality of values if the predicted movement exceeds a maximum value.

91. The invention as in claim 82, wherein the circuitry selects the third array to produce the second plurality of values if the prediction exceeds a value related to the position of the portion of first array used to produce the first plurality of values.

92. The invention as in claim 82, wherein the circuitry suspends sending signals related to the then current movement of the housing if no value related to a valid movement is identified.

93. The invention as in claim 82, wherein the circuitry sends signals not related to the then current second movement if a value related to a valid second movement is not identified.

94. The invention as in claim 82, wherein the circuitry suspends sending signals related to a valid current movement of the housing if the plurality of portions of the second array are sufficiently uniform to indicate invalid data.

95. The invention as in claim 81, wherein the circuitry produces the first plurality of values by correlation.

96. The invention as in claim 81, wherein the circuitry identifies a value representing a valid first movement by comparing the values.

97. The invention as in claim 81, wherein the circuitry produces the first plurality of values by correlation and identifies a value related to a valid first movement by comparing the correlation results.

98. The invention as in claim 81, wherein the circuitry identifies a value representing a valid first movement if that value is not sufficiently uniform in value with the other values in the first plurality of values to indicate invalid data.

99. The invention as in claim 81, wherein the circuitry does not identify a value representing a valid first movement if the values are sufficiently uniform.

100. The invention as in claim 81, wherein the first plurality of values represents an array of values and the circuitry identifies a value representing a valid first movement by analysis of surrounding values in the array of values.

101. The invention as in claim 81, wherein the prediction is related to the first valid movement.

102. The invention as in claim 81, wherein the circuitry selects the third array to produce the second plurality of values if the predicted movement exceeds a maximum value.

103. The invention as in claim 81, wherein the circuitry selects the third array to produce the second plurality of values if the prediction exceeds a value related to the position of the portion of first array used to produce the first plurality of values.

104. The invention as in claim 81, wherein the circuitry suspends sending signals related to the then current movement of the housing if no value related to a valid movement is identified.

105. The invention as in claim 81, wherein the circuitry sends signals not related to the then current second movement if a value related to a valid second movement is not identified.

106. The invention as in claim 81, wherein the circuitry suspends sending signals related to a valid current movement of the housing if the plurality of portions of the second array are sufficiently uniform to indicate invalid data.

107. The invention of claim 80 wherein the circuitry analyzes the prediction in accordance with the selected first portion of the first array to select one of a second portion of the first array and a third array of the plurality of arrays to process with portions of a fourth array of the plurality of arrays to produce a second plurality of values.

108. The invention of claim 107 wherein the circuitry processes the second plurality of values to send a signal to the computer related to a valid second movement.

109. The invention as in claim 108, wherein the circuitry produces the first plurality of values by correlation.

110. The invention as in claim 108, wherein the circuitry identifies a value representing a valid first movement by comparing the values.

111. The invention as in claim 108, wherein the circuitry produces the first plurality of values by correlation and identifies a value related to a valid first movement by comparing the correlation results.

112. The invention as in claim 108, wherein the circuitry identifies a value representing a valid first movement if that value is not sufficiently uniform in value with the other values in the first plurality of values to indicate invalid data.

113. The invention as in claim 108, wherein the circuitry does not identify a value representing a valid first movement if the values are sufficiently uniform.

114. The invention as in claim 108, wherein the first plurality of values represents an array of values and the circuitry identifies a value representing a valid first movement by analysis of surrounding values in the array of values.

115. The invention as in claim 108, wherein the prediction is related to the first valid movement.

116. The invention as in claim 108, wherein the circuitry selects the third array to produce the second plurality of values if the predicted movement exceeds a maximum value.

117. The invention as in claim 108, wherein the circuitry selects the third array to produce the second plurality of values if the prediction exceeds a value related to the position of the portion of first array used to produce the first plurality of values.

118. The invention as in claim 108, wherein the circuitry suspends sending signals related to the then current movement of the housing if no value related to a valid movement is identified.

119. The invention as in claim 108, wherein the circuitry sends signals not related to the then current second movement if a value related to a valid second movement is not identified.

120. The invention as in claim 108, wherein the circuitry suspends sending signals related to a valid current movement of the housing if the plurality of portions of the second array are sufficiently uniform to indicate invalid data.

121. The invention as in claim 107, wherein the circuitry produces the first plurality of values by correlation.

122. The invention as in claim 107, wherein the circuitry identifies a value representing a valid first movement by comparing the values.

123. The invention as in claim 107, wherein the circuitry produces the first plurality of values by correlation and identifies a value related to a valid first movement by comparing the correlation results.

124. The invention as in claim 107, wherein the circuitry identifies a value representing a valid first movement if that value is not sufficiently uniform in value with the other values in the first plurality of values to indicate invalid data.

125. The invention as in claim 107, wherein the circuitry does not identify a value representing a valid first movement if the values are sufficiently uniform.

126. The invention as in claim 107, wherein the first plurality of values represents an array of values and the circuitry identifies a value representing a valid first movement by analysis of surrounding values in the array of values.

127. The invention as in claim 107, wherein the prediction is related to the first valid movement.

128. The invention as in claim 107, wherein the circuitry selects the third array to produce the second plurality of values if the predicted movement exceeds a maximum value.

129. The invention as in claim 107, wherein the circuitry selects the third array to produce the second plurality of values if the prediction exceeds a value related to the position of the portion of first array used to produce the first plurality of values.

130. The invention as in claim 107, wherein the circuitry suspends sending signals related to the then current movement of the housing if no value related to a valid movement is identified.

131. The invention as in claim 107, wherein the circuitry suspends sending signals related to a valid current movement of the housing if the plurality of portions of the second array are sufficiently uniform to indicate invalid data.

132. The invention of claim 80 wherein the circuitry sends a signal to the computer related to the valid first movement.

133. The invention as in claim 132, wherein the circuitry produces the first plurality of values by correlation.

134. The invention as in claim 132, wherein the circuitry identifies a value representing a valid first movement by comparing the values.

135. The invention as in claim 132, wherein the circuitry produces the first plurality of values by correlation and identifies a value related to a valid first movement by comparing the correlation results.

136. The invention as in claim 132, wherein the circuitry identifies a value representing a valid first movement if that value is not sufficiently uniform in value with the other values in the first plurality of values to indicate invalid data.

137. The invention as in claim 132, wherein the circuitry does not identify a value representing a valid first movement if the values are sufficiently uniform.

138. The invention as in claim 132, wherein the first plurality of values represents an array of values and the circuitry identifies a value representing a valid first movement by analysis of surrounding values in the array of values.

139. The invention as in claim 132, wherein the prediction is related to the first valid movement.

140. The invention as in claim 132, wherein the circuitry suspends sending signals related to the then current movement of the housing if no value related to a valid movement is identified.

141. The invention as in claim 132, wherein the circuitry sends signals not related to the then current second movement if a value related to a valid second movement is not identified.

142. The invention as in claim 132, wherein the circuitry suspends sending signals related to a valid current movement of the housing if the plurality of portions of the second array are sufficiently uniform to indicate invalid data.

143. The invention as in claim 80, wherein the circuitry produces the first plurality of values by correlation.

144. The invention as in claim 80, wherein the circuitry identifies a value representing a valid first movement by comparing the values.

145. The invention as in claim 80, wherein the circuitry produces the first plurality of values by correlation and identifies a value related to a valid first movement by comparing the correlation results.

146. The invention as in claim 80, wherein the circuitry identifies a value representing a valid first movement if that value is not sufficiently uniform in value with the other values in the first plurality of values to indicate invalid data.

147. The invention as in claim 80, wherein the circuitry does not identify a value representing a valid first movement if the values are sufficiently uniform.

148. The invention as in claim 80, wherein the first plurality of values represents an array of values and the circuitry identifies a value representing a valid first movement by analysis of surrounding values in the array of values.

149. The invention as in claim 80, wherein the circuitry suspends sending signals related to the then current movement of the housing if no value related to a valid movement is identified.

150. The invention as in claim 80, wherein the circuitry suspends sending signals related to a valid current movement of the housing if the plurality of portions of the second array are sufficiently uniform to indicate invalid data.

151. A hand operated pointing device for use with a computer, comprising:
a movable housing;
a light source illuminating a work surface; and
circuitry in the movable housing using a plurality of two dimensional arrays of data related to light reflected by the illuminated work surface to produce a first plurality of values by processing a selected first portion of a first array of the plurality of arrays with a plurality of portions of a second array of the plurality of arrays, the circuitry produces a second plurality of values by processing a second selected portion of the first array with portions of a third array and processes the first and second pluralities of values to identify first and second movements of the housing relative to the work surface.

152. The invention of claim 151 wherein the circuitry derives predictions of movements from the first and second plurality of values.

153. The invention of claim 152 wherein the circuitry uses the movement predicted from the second plurality of values and the second selected portion of the first array to select one of a third portion of the first array and a third array of the plurality of arrays, to process with a fourth array of the plurality of arrays to produce a third plurality of values.

154. The invention of claim 153 wherein the circuitry processes the first, second and third plurality of values and provides a signal to the computer related to valid movements of the housing when values related to valid movements are identified or provides a signal not related to valid movements when values related to valid movements are not identified.

155. The invention as in claim 154, wherein the circuitry produces the first plurality of values by correlation.

156. The invention as in claim 154, wherein the circuitry identifies a value representing a valid first movement by comparing the values.

157. The invention as in claim 154, wherein the circuitry produces the first plurality of values by correlation and identifies a value related to a valid first movement by comparing the correlation results.

158. The invention as in claim 154, wherein the circuitry identifies a value representing a valid first movement if that value is not sufficiently uniform in value with the other values in the first plurality of values to indicate invalid data.

159. The invention as in claim 154, wherein the circuitry does not identify a value representing a valid first movement if the values are sufficiently uniform.

160. The invention as in claim 154, wherein the first plurality of values represents an array of values and the circuitry identifies a value representing a valid first movement by analysis of surrounding values in the array of values.

161. The invention as in claim 154, wherein the prediction is related to the first valid movement.

162. The invention as in claim 154, wherein the circuitry selects the third array to produce the second plurality of values if the predicted movement exceeds a maximum value.

163. The invention as in claim 154, wherein the circuitry suspends sending signals related to the then current movement of the housing if no value related to a valid movement is identified.

164. The invention as in claim 154, wherein the circuitry sends signals not related to the then current second movement if a value related to a valid second movement is not identified.

165. The invention as in claim 154, wherein the circuitry suspends sending signals related to a valid current movement of the housing if the plurality of portions of the second array are sufficiently uniform to indicate invalid data.

166. The invention as in claim 154, wherein the source of light further comprises:
a source of non-coherent light illuminating surface irregularities on the work surface at an angle of incidence sufficiently low to produce suitable arrays of data.

167. The invention as in claim 153, wherein the circuitry produces the first plurality of values by correlation.

168. The invention as in claim 153, wherein the circuitry identifies a value representing a valid first movement by comparing the values.

169. The invention as in claim 153, wherein the circuitry produces the first plurality of values by correlation and identifies a value related to a valid first movement by comparing the correlation results.

170. The invention as in claim 153, wherein the circuitry identifies a value representing a valid first movement if that value is not sufficiently uniform in value with the other values in the first plurality of values to indicate invalid data.

171. The invention as in claim 153, wherein the circuitry does not identify a value representing a valid first movement if the values are sufficiently uniform.

172. The invention as in claim 153, wherein the first plurality of values represents an array of values and the circuitry identifies a value representing a valid first movement by analysis of surrounding values in the array of values.

173. The invention as in claim 153, wherein the prediction is related to the first valid movement.

174. The invention as in claim 153, wherein the circuitry selects the third array to produce the second plurality of values if the predicted movement exceeds a maximum value.

175. The invention as in claim 153, wherein the circuitry selects the third array to produce the second plurality of values if the prediction exceeds a value related to the position of the portion of first array used to produce the first plurality of values.

176. The invention as in claim 153, wherein the circuitry sends signals not related to the then current second movement if a value related to a valid second movement is not identified.

177. The invention as in claim 153, wherein the circuitry suspends sending signals related to a valid current movement of the housing if the plurality of portions of the second array are sufficiently uniform to indicate invalid data.

178. The invention as in claim 153, wherein the source of light further comprises:
a source of non-coherent light illuminating surface irregularities on the work surface at an angle of incidence sufficiently low to produce suitable arrays of data.

179. The invention as in claim 152, wherein the circuitry produces the first plurality of values by correlation.

180. The invention as in claim 152, wherein the circuitry identifies a value representing a valid first movement by comparing the values.

181. The invention as in claim 152, wherein the circuitry produces the first plurality of values by correlation and identifies a value related to a valid first movement by comparing the correlation results.

182. The invention as in claim 152, wherein the circuitry identifies a value representing a valid first movement if that value is not sufficiently uniform in value with the other values in the first plurality of values to indicate invalid data.

183. The invention as in claim 152, wherein the circuitry does not identify a value representing a valid first movement if the values are sufficiently uniform.

184. The invention as in claim 152, wherein the first plurality of values represents an array of values and the circuitry identifies a value representing a valid first movement by analysis of surrounding values in the array of values.

185. The invention as in claim 152, wherein the prediction is related to the first valid movement.

186. The invention as in claim 152, wherein the circuitry selects the third array to produce the second plurality of values if the predicted movement exceeds a maximum value.

187. The invention as in claim 152, wherein the circuitry sends signals not related to the then current second movement if a value related to a valid second movement is not identified.

188. The invention as in claim 152, wherein the circuitry suspends sending signals related to a valid current movement of the housing if the plurality of portions of the second array are sufficiently uniform to indicate invalid data.

189. The invention as in claim 152, wherein the source of light further comprises:
a source of non-coherent light illuminating surface irregularities on the work surface at an angle of incidence sufficiently low to produce suitable arrays of data.

190. The invention as in claim 151, wherein the circuitry produces the first plurality of values by correlation.

191. The invention as in claim 151, wherein the circuitry identifies a value representing a valid first movement by comparing the values.

192. The invention as in claim 151, wherein the circuitry produces the first plurality of values by correlation and identifies a value related to a valid first movement by comparing the correlation results.

193. The invention as in claim 151, wherein the circuitry identifies a value representing a valid first movement if that value is not sufficiently uniform in value with the other values in the first plurality of values to indicate invalid data.

194. The invention as in claim 151, wherein the circuitry does not identify a value representing a valid first movement if the values are sufficiently uniform.

195. The invention as in claim 151, wherein the first plurality of values represents an array of values and the circuitry identifies a value representing a valid first movement by analysis of surrounding values in the array of values.

196. The invention as in claim 151, wherein the circuitry sends signals not related to the then current second movement if a value related to a valid second movement is not identified.

197. The invention as in claim 151, wherein the circuitry suspends sending signals related to a valid current movement of the housing if the plurality of portions of the second array are sufficiently uniform to indicate invalid data.

198. The invention as in claim 151, wherein the source of light further comprises:
a source of non-coherent light illuminating surface irregularities on the work surface at an angle of incidence sufficiently low to produce suitable arrays of data.

199. A hand operated pointing device for use with a computer, comprising:
a movable housing;
a light source illuminating a work surface; and
circuitry in the movable housing using a plurality of arrays of data related to light reflected by the illuminated work surface to produce a first plurality of values by processing at least a portion of a first array of the plurality of arrays with a plurality of portions of a second array of the plurality of arrays, the circuitry derives a prediction of a movement of the housing relative to the work surface from the first plurality of values.

200. The invention of claim 199, wherein the circuitry selects one of a portion of the first array and a third array of the plurality of arrays in accordance with the prediction to produce a second plurality of values.

201. The invention of claim 200 wherein the circuitry processes the values of the second plurality of values and sends a signal to the computer related to a valid movement only if a value related to a valid second movement is identified.

202. The invention as in claim 201 wherein a selected portion of the first array is processed to produce the first plurality of values.

203. The invention as in claim 201, wherein the circuitry produces the first plurality of values by correlation.

204. The invention as in claim 201, wherein the circuitry identifies a value representing a valid first movement by comparing the values.

205. The invention as in claim 201, wherein the circuitry produces the first plurality of values by correlation and identifies a value related to a valid first movement by comparing the correlation results.

206. The invention as in claim 201, wherein the circuitry identifies a value representing a valid first movement if that value is not sufficiently uniform in value with the other values in the first plurality of values to indicate invalid data.

207. The invention as in claim 201, wherein the circuitry does not identify a value representing a valid first movement if the values are sufficiently uniform.

208. The invention as in claim 201, wherein the first plurality of values represents an array of values and the circuitry identifies a value representing a valid first movement by analysis of surrounding values in the array of values.

209. The invention as in claim 201, wherein the prediction is related to the first valid movement.

210. The invention as in claim 201, wherein the circuitry selects the third array to produce the second plurality of values if the predicted movement exceeds a maximum value.

211. The invention as in claim 201, wherein the circuitry selects the third array to produce the second plurality of values if the prediction exceeds a value related to the position of the portion of first array used to produce the first plurality of values.

212. The invention as in claim 201, wherein the circuitry suspends sending signals related to the then current movement of the housing if no value related to a valid movement is identified.

213. The invention as in claim 201, wherein the circuitry sends signals not related to the then current second movement if a value related to a valid second movement is not identified.

214. The invention as in claim 201, wherein the circuitry suspends sending signals related to a valid current movement of the housing if the plurality of portions of the second array are sufficiently uniform to indicate invalid data.

215. The invention as in claim 201, wherein the source of light farther comprises:
a source of non-coherent light illuminating surface irregularities on the work surface at an angle of incidence sufficiently low to produce suitable arrays of data.

216. The invention as in claim 200 wherein a selected portion of the first array is processed to produce the first plurality of values.

217. The invention as in claim 200, wherein the circuitry produces the first plurality of values by correlation.

218. The invention as in claim 200, wherein the circuitry identifies a value representing a valid first movement by comparing the values.

219. The invention as in claim 200, wherein the circuitry produces the first plurality of values by correlation and identifies a value related to a valid first movement by comparing the correlation results.

220. The invention as in claim 200, wherein the circuitry identifies a value representing a valid first movement if that value is not sufficiently uniform in value with the other values in the first plurality of values to indicate invalid data.

221. The invention as in claim 200, wherein the circuitry does not identify a value representing a valid first movement if the values are sufficiently uniform.

222. The invention as in claim 200, wherein the first plurality of values represents an array of values and the circuitry identifies a value representing a valid first movement by analysis of surrounding values in the array of values.

223. The invention as in claim 200, wherein the prediction is related to the first valid movement.

224. The invention as in claim 200, wherein the circuitry selects the third array to produce the second plurality of values if the predicted movement exceeds a maximum value.

225. The invention as in claim 200, wherein the circuitry selects the third array to produce the second plurality of values if the prediction exceeds a value related to the position of the portion of first array used to produce the first plurality of values.

226. The invention as in claim 200, wherein the circuitry suspends sending signals related to a valid current movement of the housing if the plurality of portions of the second array are sufficiently uniform to indicate invalid data.

227. The invention as in claim 200, wherein the source of light further comprises:

a source of non-coherent light illuminating surface irregularities on the work surface at an angle of incidence sufficiently low to produce suitable arrays of data.

228. The invention of claim 199, wherein the circuitry processes the values of the first plurality of values and sends a signal to the computer related to a valid movement only if a value related to a valid movement is identified.

229. The invention as in claim 228 wherein a selected portion of the first array is processed to produce the first plurality of values.

230. The invention as in claim 228, wherein the circuitry produces the first plurality of values by correlation.

231. The invention as in claim 228, wherein the circuitry identifies a value representing a valid first movement by comparing the values.

232. The invention as in claim 228, wherein the circuitry produces the first plurality of values by correlation and identifies a value related to a valid first movement by comparing the correlation results.

233. The invention as in claim 228, wherein the circuitry identifies a value representing a valid first movement if that value is not sufficiently uniform in value with the other values in the first plurality of values to indicate invalid data.

234. The invention as in claim 228, wherein the circuitry does not identify a value representing a valid first movement if the values are sufficiently uniform.

235. The invention as in claim 228, wherein the first plurality of values represents an array of values and the circuitry identifies a value representing a valid first movement by analysis of surrounding values in the array of values.

236. The invention as in claim 228, wherein the prediction is related to the first valid movement.

237. The invention as in claim 228, wherein the circuitry selects the third array to produce the second plurality of values if the predicted movement exceeds a maximum value.

238. The invention as in claim 228, wherein the circuitry suspends sending signals related to the then current movement of the housing if no value related to a valid movement is identified.

239. The invention as in claim 228, wherein the circuitry suspends sending signals related to a valid current movement of the housing if the plurality of portions of the second array are sufficiently uniform to indicate invalid data.

240. The invention as in claim 228, wherein the source of light further comprises:

a source of non-coherent light illuminating surface irregularities on the work surface at an angle of incidence sufficiently low to produce suitable arrays of data.

241. The invention as in claim 199 wherein a selected portion of the first array is processed to produce the first plurality of values.

242. The invention as in claim 199, wherein the circuitry produces the first plurality of values by correlation.

243. The invention as in claim 199, wherein the circuitry identifies a value representing a valid first movement by comparing the values.

244. The invention as in claim 199, wherein the circuitry produces the first plurality of values by correlation and identifies a value related to a valid first movement by comparing the correlation results.

245. The invention as in claim 199, wherein the circuitry identifies a value representing a valid first movement if that value is not sufficiently uniform in value with the other values in the first plurality of values to indicate invalid data.

246. The invention as in claim 199, wherein the circuitry does not identify a value representing a valid first movement if the values are sufficiently uniform.

247. The invention as in claim 199, wherein the first plurality of values represents an array of values and the circuitry identifies a value representing a valid first movement by analysis of surrounding values in the array of values.

248. The invention as in claim 199, wherein the prediction is related to the first valid movement.

249. The invention as in claim 199, wherein the circuitry suspends sending signals related to a valid current movement of the housing if the plurality of portions of the second array are sufficiently uniform to indicate invalid data.

250. The invention as in claim 199, wherein the source of light further comprises:

a source of non-coherent light illuminating surface irregularities on the work surface at an angle of incidence sufficiently low to produce suitable arrays of data.

251. A hand operated pointing device for use with a computer, comprising:

a movable housing;

a light source illuminating a work surface; and circuitry in the movable housing using a plurality of arrays of data related to light reflected by the illuminated work surface to produce a first plurality of values by processing at least a portion of a first array of the plurality of arrays with a plurality of portions of a second array of the plurality of arrays, the circuitry selects one of a portion of the first array and a third array of the plurality of arrays in accordance with a prediction of a movement to produce a second plurality of values.

252. The invention of claim 251 wherein the circuitry processes the values of the second plurality of values and sends a signal to the computer related to a valid second movement only if a value related to a valid second movement is identified.

253. The invention as in claim 252, wherein the circuitry produces the first plurality of values by correlation.

254. The invention as in claim 252, wherein the circuitry identifies a value representing a valid first movement by comparing the values.

255. The invention as in claim 252, wherein the circuitry produces the first plurality of values by correlation and identifies a value related to a valid first movement by comparing the correlation results.

256. The invention as in claim 252, wherein the circuitry identifies a value representing a valid first movement if that value is not sufficiently uniform in value with the other values in the first plurality of values to indicate invalid data.

257. The invention as in claim 252, wherein the circuitry does not identify a value representing a valid first movement if the values are sufficiently uniform.

258. The invention as in claim 252, wherein the first plurality of values represents an array of values and the circuitry identifies a value representing a valid first movement by analysis of surrounding values in the array of values.

259. The invention as in claim 252, wherein the prediction is related to the first valid movement.

260. The invention as in claim 252, wherein the circuitry selects the third array to produce the second plurality of values if the predicted movement exceeds a maximum value.

261. The invention as in claim 252, wherein the circuitry selects the third array to produce the second plurality of values if the prediction exceeds a value related to the position of the portion of first array used to produce the first plurality of values.

262. The invention as in claim 252, wherein the circuitry suspends sending signals related to the then current movement of the housing if no value related to a valid movement is identified.

263. The invention as in claim 252, wherein the circuitry suspends sending signals related to a valid current movement of the housing if the plurality of portions of the second array are sufficiently uniform to indicate invalid data.

264. The invention as in claim 252, wherein the source of light further comprises:
a source of non-coherent light illuminating surface irregularities on the work surface at an angle of incidence sufficiently low to produce suitable arrays of data.

265. The invention as in claim 251 wherein a selected portion of the first array is processed to produce the first plurality of values.

266. The invention as in claim 251, wherein the circuitry produces the first plurality of values by correlation.

267. The invention as in claim 251, wherein the circuitry identifies a value representing a valid first movement by comparing the values.

268. The invention as in claim 251, wherein the circuitry produces the first plurality of values by correlation and identifies a value related to a valid first movement by comparing the correlation results.

269. The invention as in claim 251, wherein the circuitry identifies a value representing a valid first movement if that value is not sufficiently uniform in value with the other values in the first plurality of values to indicate invalid data.

270. The invention as in claim 251, wherein the circuitry does not identify a value representing a valid first movement if the values are sufficiently uniform.

271. The invention as in claim 251, wherein the first plurality of values represents an array of values and the circuitry identifies a value representing a valid first movement by analysis of surrounding values in the array of values.

272. The invention as in claim 251, wherein the prediction is related to the first valid movement.

273. The invention as in claim 251, wherein the circuitry selects the third array to produce the second plurality of values if the predicted movement exceeds a maximum value.

274. The invention as in claim 251, wherein the circuitry selects the third array to produce the second plurality of values if the prediction exceeds a value related to the position of the portion of first array used to produce the first plurality of values.

275. The invention as in claim 251, wherein the circuitry suspends sending signals related to a valid current movement of the housing if the plurality of portions of the second array are sufficiently uniform to indicate invalid data.

276. The invention as in claim 251, wherein the source of light further comprises:
a source of non-coherent light illuminating surface irregularities on the work surface at an angle of incidence sufficiently low to produce suitable arrays of data.

277. A hand operated pointing device for use with a computer, comprising:
a movable housing;
a light source illuminating a work surface; and
circuitry in the movable housing using a plurality of arrays of data related to light reflected by the illuminated work surface to produce a first plurality of values by processing at least a portion of a first array of the plurality of arrays with a plurality of portions of a second array of the plurality of arrays, the circuitry processes the values of the first plurality of values and sends a signal to the computer related to a valid movement of the housing with respect to the work surface only if a value related to a valid movement is identified.

278. The invention as in claim 277 wherein a selected portion of the first array is processed to produce the first plurality of values.

279. The invention as in claim 277, wherein the circuitry produces the first plurality of values by correlation.

280. The invention as in claim 277, wherein the circuitry identifies a value representing a valid first movement by comparing the values.

281. The invention as in claim 277, wherein the circuitry produces the first plurality of values by correlation and identifies a value related to a valid first movement by comparing the correlation results.

282. The invention as in claim 277, wherein the circuitry identifies a value representing a valid first movement if that value is not sufficiently uniform in value with the other values in the first plurality of values to indicate invalid data.

283. The invention as in claim 277, wherein the circuitry does not identify a value representing a valid first movement if the values are sufficiently uniform.

284. The invention as in claim 277, wherein the first plurality of values represents an array of values and the circuitry identifies a value representing a valid first movement by analysis of surrounding values in the array of values.

285. The invention as in claim 277, wherein the circuitry suspends sending signals related to the then current movement of the housing if no value related to a valid movement is identified.

286. The invention as in claim 277, wherein the circuitry suspends sending signals related to a valid current movement of the housing if the plurality of portions of the second array are sufficiently uniform to indicate invalid data.

287. The invention as in claim 277, wherein the source of light further comprises:
a source of non-coherent light illuminating surface irregularities on the work surface at an angle of incidence sufficiently low to produce suitable arrays of data.

* * * * *